United States Patent
Yagi et al.

(10) Patent No.: US 11,966,071 B2
(45) Date of Patent: Apr. 23, 2024

(54) ILLUMINATION DEVICE INCLUDING FIRST TO THIRD SHEETS AND DISPLAY DEVICE INCLUDING THE SAME

(71) Applicant: Sharp Display Technology Corporation, Kameyama (JP)

(72) Inventors: Shugo Yagi, Kameyama (JP); Junichi Masuda, Kameyama (JP); Yuuichi Kanbayashi, Kameyama (JP); Satoshi Tsubooka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/111,741

(22) Filed: Feb. 20, 2023

(65) Prior Publication Data

US 2023/0273362 A1  Aug. 31, 2023

(30) Foreign Application Priority Data

Feb. 28, 2022 (JP) ................................. 2022-029142

(51) Int. Cl.
  *F21V 8/00* (2006.01)
(52) U.S. Cl.
  CPC .......... *G02B 6/0036* (2013.01); *G02B 6/003* (2013.01); *G02B 6/0038* (2013.01); *G02B 6/0048* (2013.01); *G02B 6/0053* (2013.01); *G02B 6/0075* (2013.01); *G02B 6/0076* (2013.01)

(58) Field of Classification Search
  CPC .. G02B 6/0036; G02B 6/0038; G02B 6/0048; G02B 6/0053; G02B 6/0075
  See application file for complete search history.

(56) References Cited

U.S. PATENT DOCUMENTS

| | | | |
|---|---|---|---|
| 3,511,563 A | * | 5/1970 | Erwin ................ G03B 21/132 |
| | | | 353/38 |
| 6,398,370 B1 | | 6/2002 | Chiu et al. |
| 2002/0018341 A1 | * | 2/2002 | Torihara ................ G02B 6/005 |
| | | | 362/601 |
| 2006/0291243 A1 | | 12/2006 | Niioka et al. |
| 2011/0280044 A1 | | 11/2011 | Niioka et al. |
| 2014/0049944 A1 | | 2/2014 | Niioka et al. |

(Continued)

FOREIGN PATENT DOCUMENTS

| JP | 2007003951 A | 1/2007 |
|---|---|---|
| JP | 2016110854 A | 6/2016 |

(Continued)

*Primary Examiner* — Keith G. Delahoussaye
(74) *Attorney, Agent, or Firm* — ScienBiziP, P.C.

(57) ABSTRACT

According to an aspect of the disclosure, an illumination device includes: a first sheet including a first light entering main surface, a first light emission main surface, two first light blocking portions disposed at an interval in a first direction, and a first light-transmitting portion disposed between the two first light blocking portions; a second sheet including a second light entering main surface facing the first light emission main surface, a second light emission main surface, and a first lens; and a third sheet including a third light entering main surface facing the second light emission main surface, a third light emission main surface, two second light blocking portions disposed at an interval in the first direction, and a second light-transmitting portion disposed between the two second light blocking portions.

11 Claims, 16 Drawing Sheets

(56) References Cited

U.S. PATENT DOCUMENTS

| | | | |
|---|---|---|---|
| 2019/0285790 A1* | 9/2019 | Usukura | G02B 27/02 |
| 2019/0302461 A1* | 10/2019 | Kanbayashi | G02B 5/0205 |
| 2021/0397041 A1 | 12/2021 | Kashiwagi et al. | |
| 2022/0299820 A1 | 9/2022 | Kashiwagi | |
| 2022/0365271 A1* | 11/2022 | Kijima | G02B 6/0053 |
| 2023/0003932 A1* | 1/2023 | Lai | G02B 6/0056 |
| 2023/0324735 A1 | 10/2023 | Kashiwagi | |

FOREIGN PATENT DOCUMENTS

| | | |
|---|---|---|
| WO | 0241048 A1 | 5/2002 |
| WO | 2018181966 A1 | 10/2018 |

* cited by examiner

ILLUMINATION DEVICE INCLUDING FIRST TO THIRD SHEETS AND DISPLAY DEVICE INCLUDING THE SAME

CROSS-REFERENCE TO RELATED APPLICATIONS

This application claims the benefit of priority to Japanese Patent Application Number 2022-029142 filed on Feb. 28, 2022. The entire contents of the above-identified application are hereby incorporated by reference.

BACKGROUND

The techniques disclosed in the present specification relate to an illumination device and a display device.

TECHNICAL FIELD

As an example of an illumination device provided in a liquid crystal display device in the related art, a planar illumination device described in Japanese Unexamined Patent Application Publication No. 2016-110854 is known. The planar illumination device described in Japanese Unexamined Patent Application Publication No. 2016-110854 includes an optical path change means for changing a traveling direction of light in a position of at least one of an incident surface and an emitting surface of a louver, which faces an end face of a light blocking body. The optical path change means provided on the incident surface side of the louver changes the traveling direction of the light that is incident on the end face of the light blocking body of the louver from a light source unit and is absorbed, and the optical path change means guides the light to a light-transmitting layer of the louver.

In a planar illumination device as described in Japanese Unexamined Patent Application Publication No. 2016-110854 A described above, there is a concern that a brightness distribution of emission light becomes non-uniform when an emission angle of the light is excessively restricted by the louver so as not to generate side lobe light. In other words, although brightness of the emission light is high in a central side portion of the planar illumination device, brightness of the emission light may significantly decrease in both end side portions.

The techniques described in the present specification have been made based on the circumstances described above, and an object thereof is to make a brightness distribution uniform.

SUMMARY (1) An illumination device according to the techniques described in the present specification includes: a first sheet including a first light entering main surface being one main surface disposed along a first direction, a first light emission main surface being an other main surface along the first direction, two first light blocking portions disposed at an interval in the first direction, and a first light-transmitting portion disposed between the two first light blocking portions; a second sheet including a second light entering main surface being one main surface disposed along the first direction and configured to face the first light emission main surface, a second light emission main surface being an other main surface along the first direction, and a first lens disposed on the second light entering main surface or the second light emission main surface; and a third sheet including a third light entering main surface being one main surface disposed along the first direction and configured to face the second light emission main surface, a third light emission main surface being an other main surface along the first direction, two second light blocking portions disposed at an interval in the first direction, and a second light-transmitting portion disposed between the two second light blocking portions, wherein the first lens includes a first inclined surface having an inclination rising from an end side in the first direction in the second sheet toward a central side, and the third sheet has a ratio acquired by dividing a width of the second light-transmitting portion by a height of the second light-transmitting portion greater than a ratio acquired by dividing a width of the first light-transmitting portion by a height of the first light-transmitting portion.

(2) Further, in addition to (1) described above, in the illumination device, a plurality of the first lenses may be disposed side by side in the first direction, the plurality of the first lenses may include a central side lens, and an end side lens located closer to the end side in the first direction in the second sheet than the central side lens, and an angle formed by the first inclined surface of the end side lens with respect to the first direction may be greater than an angle formed by the first inclined surface of the central side lens with respect to the first direction.

(3) Further, in addition to (2) described above, in the illumination device, each first lens of the plurality of the first lenses may include a second inclined surface having an inclination rising from the central side in the first direction in the second sheet toward the end side.

(4) Further, in addition to (3) described above, in the illumination device, an apex angle being an angle formed between the first inclined surface and the second inclined surface of the central side lens may be equal to the apex angle of the end side lens, and an angle formed by the second inclined surface of the end side lens with respect to the first direction may be smaller than an angle formed by the second inclined surface of the central side lens with respect to the first direction.

(5) Further, in addition to (4) described above, in the illumination device, the plurality of the first lenses may have an angle formed by the first inclined surface with respect to the first direction in a range from 0° to 24°, and may have an angle formed by the second inclined surface with respect to the first direction in a range from 46° to 70°.

(6) Further, in addition to any of (1) to (5) described above, in the illumination device, the first lens may be disposed on the second light entering main surface, and the second light emission main surface of the second sheet may be attached to the third light entering main surface of the third sheet.

(7) Further, in addition to any of (1) to (5) described above, in the illumination device, the first lens may be disposed on the second light emission main surface, and the second light entering main surface of the second sheet may be attached to the first light emission main surface of the first sheet.

(8) Further, in addition to any of (1) to (7) described above, the illumination device includes: a first light source; a first light guide plate aligned along the first direction with respect to the first light source; a first prism sheet disposed on a light emission side with respect to the first light guide plate, the first prism sheet including a plurality of first prisms disposed side by side along the first direction and configured to extend along a second direction orthogonal to both of the first direction and a normal direction of a main surface of the first light guide plate; and a second prism sheet disposed on the light emission side with respect to the first prism sheet, the second prism sheet including a plurality of second prisms disposed side by side along the first direction and configured to extend along the second direction, wherein the first light guide plate may include at least a part of an outer circumferential end face as a first light entering end face facing the first light source, and may include one main surface as a fourth light emission main surface configured to emit light, the second prism sheet may include a main surface on the light emission side facing the first light entering main surface of the first sheet, the first prism may include a third inclined surface having an inclination rising from the first light source side in the first direction in the first prism sheet toward a side opposite to the first light source, and may include a fourth inclined surface having an inclination rising from the side opposite to the first light source in the first direction in the first prism sheet toward the first light source side, the second prism may include a fifth inclined surface having an inclination rising from the first light source side in the first direction in the second prism sheet toward the side opposite to the first light source, and may include a sixth inclined surface having an inclination rising from the side opposite to the first light source in the first direction in the second prism sheet toward the first light source side, and an angle formed by the fifth inclined surface in the second prism with respect to the first direction may be smaller than an angle formed by the third inclined surface in the first prism with respect to the first direction.

(9) Further, in addition to (8) described above, the illumination device includes: a second light source; and a second light guide plate aligned along the first direction with respect to the second light source, wherein the second light guide plate may include at least a part of an outer circumferential end face as a second light entering end face facing the second light source, may include one main surface as a fifth light emission main surface configured to emit light, and may include an other main surface as an opposite main surface facing the third light emission main surface and being provided with a second lens, and the second lens may include a seventh inclined surface having an inclination rising from a side opposite to the second light source in the first direction in the second light guide plate toward the second light source side.

(10) A display device according to the techniques described in the present specification includes the illumination device according to any of (1) to (9) described above, and a display panel configured to perform display by using light from the illumination device.

According to the techniques described in the present specification, a brightness distribution can be made uniform.

DESCRIPTION OF EMBODIMENTS

The disclosure will be described with reference to the accompanying drawings, wherein like numbers reference like elements.

First Embodiment

A first embodiment will be described with reference to FIG. 1 to FIG. 12. In the present embodiment, a liquid crystal display device 10 (a display device) is exemplified. Note that an X axis, a Y axis, and a Z axis are illustrated in part of each drawing, and each axial direction is illustrated to represent a direction in each drawing. Furthermore, a vertical direction is based on the vertical direction of FIG. 2 and FIG. 3, an upper side of the same drawing is referred to as a front side, and a lower side of the same drawing is referred to as a back side.

Figure 1:
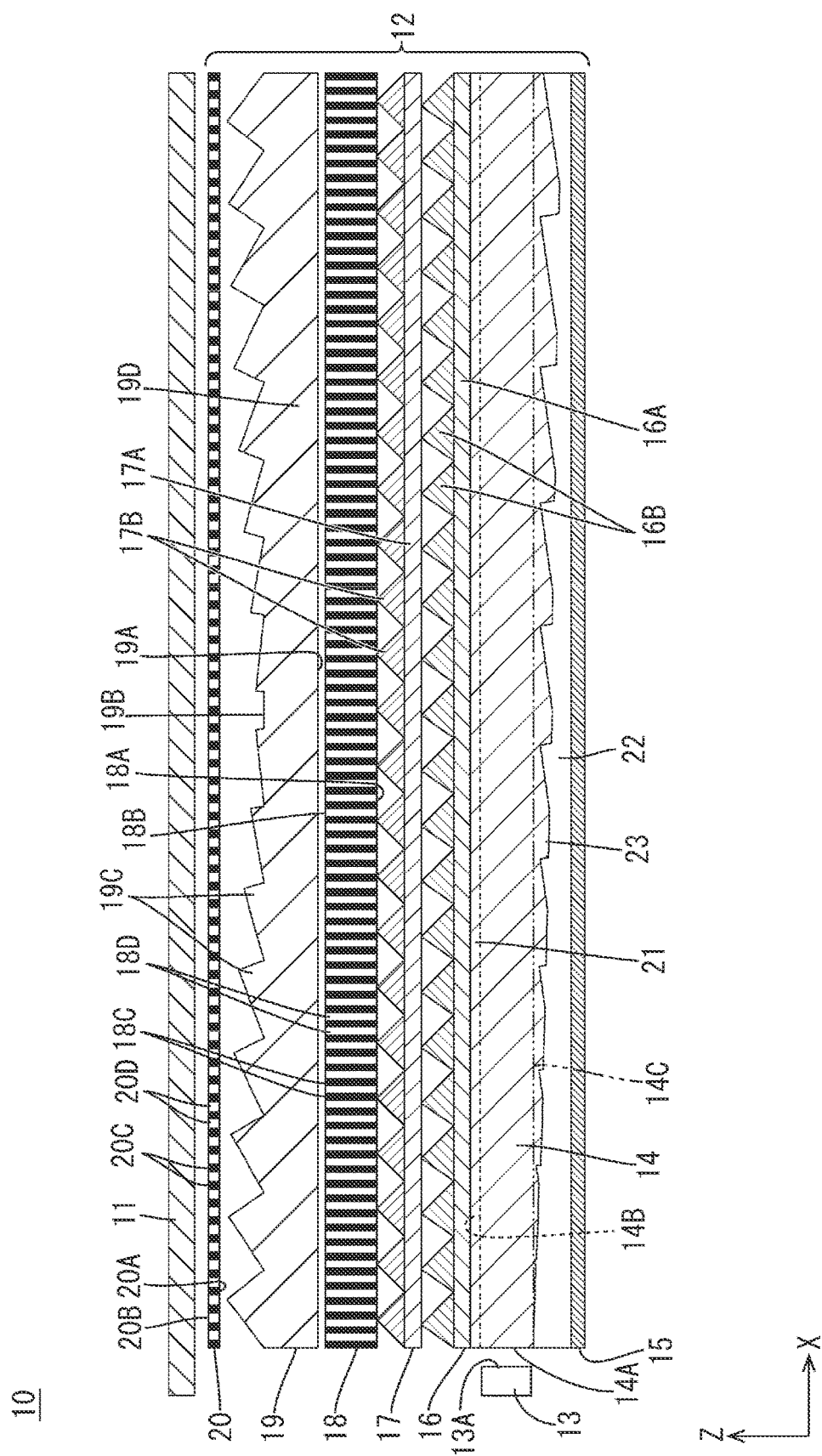
FIG. 1 is a side cross-sectional view of a liquid crystal display device according to a first embodiment.

As illustrated in FIG. 1, the liquid crystal display device 10 includes a liquid crystal panel (display panel) 11 configured to display an image, and a backlight device (illumination device) 12 disposed at a back side of the liquid crystal panel 11 and configured to irradiate the liquid crystal panel 11 with light to be used for display. In the present embodiment, the liquid crystal display device 10 being for vehicle application is exemplified. For example, the liquid crystal display device 10 for vehicle application is mounted on a car navigation system for displaying a map and the like as an image, a multi-function display that displays an operation situation and the like of equipment such as an air conditioner, in addition to a map and the like, as an image, an instrument panel that displays gauges, alerts, and the like as an image, an infotainment system for displaying a television image, audio information, and the like, in addition to a map and the like, as an image, and the like.

The liquid crystal panel 11 has a plate shape in which a main surface is parallel to the X-axis direction and the Y-axis direction, and a normal direction (thickness direction) of the main surface coincides with the Z-axis direction. In the liquid crystal panel 11, a central side portion of the main surface is a display region that can display an image, and an outer circumferential end side portion surrounding the display region and having a frame shape is a non-display region. The liquid crystal panel 11 includes a pair of substrates and a liquid crystal layer sealed between the pair of substrates. Of the pair of substrates constituting the liquid crystal panel 11, a CF substrate (counter substrate) is disposed on the front side, and an array substrate (TFT substrate) is disposed on the back side. Color filters that exhibit red (R), green (G), blue (B), and the like, a light blocking portion (black matrix) that partitions adjacent color filters, and the like are provided on the CF substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Note that an alignment film is provided on each inner face of the array substrate and the CF substrate constituting the liquid crystal panel 11. Further, a polarizer is attached to each outer face of the array substrate and the CF substrate constituting the liquid crystal panel 11.

Next, the backlight device 12 will be described. As illustrated in FIG. 1, the backlight device 12 includes at least a first LED (first light source) 13, a first light guide plate 14 that guides light from the first LED 13, a reflective sheet 15 disposed on a back side (opposite light emission side) of the first light guide plate 14, a first prism sheet 16 disposed on a front side (light emission side) of the first light guide plate 14, and a second prism sheet 17 disposed on a front side of the first prism sheet 16. The backlight device 12 is an edge light type of a one side light entering type in which light of the first LED 13 is incident on only one side of the first light guide plate 14.

As illustrated in FIG. 1, the first LED 13 has a substantially block shape, and one face of a pair of faces along the Y-axis direction and the Z-axis direction is a first light-emitting face 13A that emits light. A plurality of the first LEDs 13 are disposed side by side at an interval along the Y-axis direction. The first LED 13 is mounted on an LED substrate. The first LED 13 has a configuration in which an LED chip is sealed with a sealing material on a substrate portion mounted on the LED substrate. The LED chip provided in the first LED 13 emits light of a single color, for example, blue light. A phosphor is dispersed and mixed in the sealing material provided in the first LED 13. The phosphor contained in the sealing material includes a yellow phosphor, a green phosphor, a red phosphor, and the like. The first LED 13 including such an LED chip and such a sealing material emits white light as a whole.

The first light guide plate 14 is formed of a synthetic resin material (for example, acrylic resin such as PMMA or the like) that has a sufficiently higher refractive index than that of the air and that is substantially transparent. As illustrated in FIG. 1, the first light guide plate 14 has a plate shape, and a main surface of the first light guide plate 14 is parallel to the main surface of the liquid crystal panel 11. Note that the main surface of the first light guide plate 14 is parallel to the X-axis direction and the Y-axis direction, and a normal direction (thickness direction) of the main surface coincides with the Z-axis direction. The first light guide plate 14 is aligned along the X-axis direction (first direction) with respect to the first LED 13, and is also disposed side by side along the Z-axis direction with respect to the liquid crystal panel 11 and each of the prism sheets 16 and 17. One end face of an outer circumferential end face of the first light guide plate 14 is a first light entering end face 14A facing the first light-emitting face 13A of the first LED 13. The first light entering end face 14A is a face parallel to the first light-emitting face 13A of the first LED 13, and light emitted from the first light-emitting face 13A is incident on the first light entering end face 14A. A main surface on the front side facing the first prism sheet 16 of a pair of the main surfaces in the first light guide plate 14 is a first light guide plate-light emission main surface (fourth light emission main surface) 14B that emits light guided through the inside of the first light guide plate 14. A main surface on a back side facing the reflective sheet 15 of the pair of main surfaces in the first light guide plate 14 is a first opposite main surface 14C located on a side opposite to the first light guide plate-light emission main surface 14B. Then, the first light guide plate 14 has a function of introducing, from the first light entering end face 14A, light emitted from the first LED 13 toward the first light guide plate 14, propagating the light therein, then, allowing the light to rise along the Z-axis direction such that the light is directed toward the front side (light emission side), and emitting the light. A detailed structure of the first light guide plate 14 will be described later. Note that the normal direction of the first light entering end face 14A coincides with the X-axis direction (an alignment direction of the first LED 13 and the first light guide plate 14).

As illustrated in FIG. 1, the reflective sheet 15 has a main surface parallel to each of the main surfaces of the liquid crystal panel 11 and the first light guide plate 14, and is also disposed so as to cover the first opposite main surface 14C of the first light guide plate 14. The reflective sheet 15 has excellent light reflectivity, and can efficiently cause light leaked from the first opposite main surface 14C of the first light guide plate 14 to rise toward the front side, that is, toward the first light guide plate-light emission main surface 14B. The reflective sheet 15 has an outer shape slightly larger than that of the first light guide plate 14, and is disposed so as to overlap substantially all over the first opposite main surface 14C.

As illustrated in FIG. 1, the first prism sheet 16 and the second prism sheet 17 have a sheet shape, and each main surface is parallel to each of the main surfaces of the liquid crystal panel 11 and the first light guide plate 14. Note that the main surfaces of the first prism sheet 16 and the second prism sheet 17 are parallel to the X-axis direction and the Y-axis direction, and a normal direction (thickness direction) of the main surface coincides with the Z-axis direction. The first prism sheet 16 and the second prism sheet 17 are layered on the front side of the first light guide plate 14, and have a function of providing a predetermined optical action to light emitted from the first light guide plate-light emission main surface 14B of the first light guide plate 14 to emit the light, and the like.

As illustrated in FIG. 1, the first prism sheet 16 includes a first base material 16A having a sheet shape, and a first prism 16B provided on a main surface (light emission main surface) on a front side (light emission side) of the first base material 16A. The first base material 16A is formed of a substantially transparent synthetic resin, and specifically, is formed of, for example, a crystalline transparent resin material such as polyethylene terephthalate (PET). The first base material 16A is formed into a sheet shape by stretching the crystalline transparent resin material serving as a raw material in a biaxially stretching process in manufacturing, which is suitable for reducing manufacturing costs. The first prism 16B is formed of an ultraviolet-curing resin material being substantially transparent and being a type of photo-curable resin material. In manufacturing the first prism sheet 16, for example, an uncured ultraviolet-curing resin material is filled into a mold for molding, and the first base material 16A is also applied to an opening end of the mold to dispose the uncured ultraviolet-curing resin material so as to contact the main surface on the front side, and in this state, when the ultraviolet-curing resin material is irradiated with ultraviolet rays through the first base material 16A, the ultraviolet-curing resin material is cured, and the first prism 16B is integrally provided with the first base material 16A. The ultraviolet-curing resin material constituting the first prism 16B is, for example, an acrylic resin such as PMMA. A refractive index of the ultraviolet-curing resin material constituting the first prism 16B is preferably set within a range from 1.49 to 1.52, and is most preferably set to 1.49.

Figure 2:
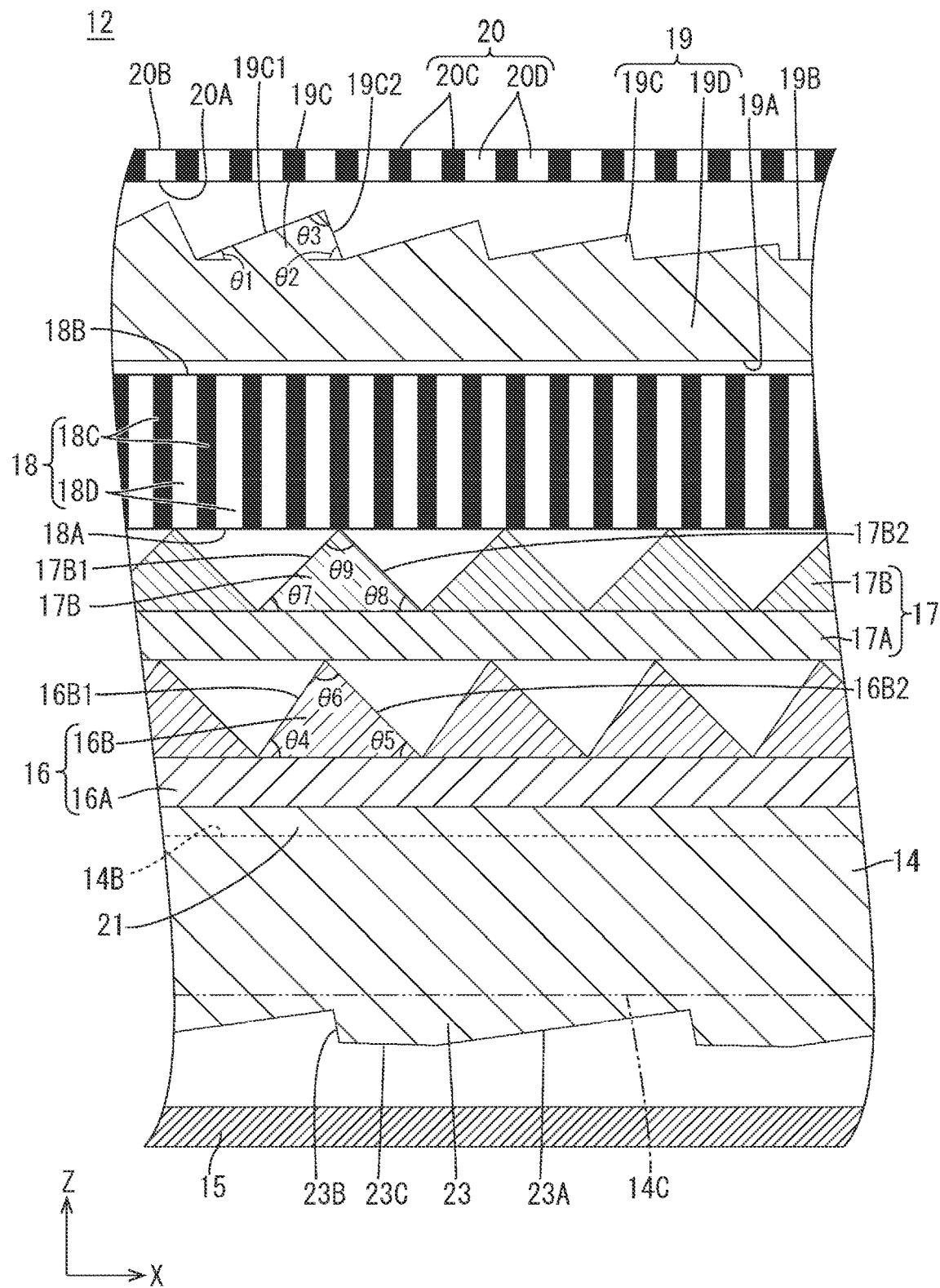
FIG. 2 is a side cross-sectional view of a backlight device provided in the liquid crystal display device.

As illustrated in FIG. 2, the first prism 16B is provided so as to protrude from the main surface of the first base material 16A toward the front side (side opposite to the first light guide plate 14 side) along the Z-axis direction. The first prism 16B has a substantially triangular shape (is substantially mountain shaped) in a cross section taken along the X-axis direction and also extends linearly along the Y-axis direction (second direction), and a plurality of the first prisms 16B are continuously disposed side by side with substantially no interval along the X-axis direction (first direction) on the main surface of the first base material 16A. The first prism 16B includes a pair of inclined surfaces 16B1 and 16B2. Of the pair of inclined surfaces 16B1 and 16B2 in the first prism 16B, the inclined surface on the first LED 13 side in the X-axis direction is a first prism inclined surface (third inclined surface) 16B1, and the inclined surface on a side opposite to the first prism inclined surface 16B1 is a second prism inclined surface (fourth inclined surface) 16B2. The first prism inclined surface 16B1 has an inclination rising from the first LED 13 side (left side in FIG. 2) in the first prism sheet 16 toward a side opposite (right side in FIG. 2) to the first LED 13 side in the X-axis direction. The first prism inclined surface 16B1 is exposed mainly to light traveling toward the first LED 13 in the X-axis direction, of light incident on the first prism 16B, to refract the light. The second prism inclined surface 16B2 has an inclination rising from the side opposite (right side in FIG. 2) to the first LED 13 side in the first prism sheet 16 toward the first LED 13 side (left side in FIG. 2) in the X-axis direction. The second prism inclined surface 16B2 is exposed mainly to light traveling away from the first LED 13 in the X-axis direction, of light incident on the first prism 16B, to refract the light. Most of the light refracted by the pair of inclined surfaces 16B1 and 16B2 in the first prism 16B is selectively raised and condensed in the X-axis direction.

Then, as illustrated in FIG. 2, in the first prism 16B, when comparing an inclination angle (third base angle) θ4 formed by the first prism inclined surface 16B1 with respect to the X-axis direction, and an inclination angle (fourth base angle) θ5 formed by the second prism inclined surface 16B2 with respect to the X-axis direction, the former is greater than the latter. In other words, the first prism 16B has an asymmetrical cross-sectional shape, which is a scalene triangle. Specifically, the inclination angle θ4 of the first prism inclined surface 16B1 with respect to the X-axis direction is preferably set within a range from 50° to 60°, and is most preferably set to 55°. In contrast, the inclination angle θ5 of the second prism inclined surface 16B2 with respect to the X-axis direction is preferably set within a range from 35° to 50°, and is most preferably set to 45°. Further, an angle (second apex angle) θ6 formed by the pair of inclined surfaces 16B1 and 16B2 in the first prism 16B is preferably set within a range from 70° to 95°, and is most preferably set to 80°. Note that all the plurality of first prisms 16B aligned along the Y-axis direction have substantially the same height dimension, substantially the same width dimension, substantially the same inclination angle of each of the inclined surfaces 16B1 and 16B2 with respect to the X-axis direction, and the like, and are also arranged such that arrangement intervals between the adjacent first prisms 16B are substantially constant and equal.

As illustrated in FIG. 1, the second prism sheet 17 includes a second base material 17A having a sheet shape, and a second prism 17B provided on a main surface (light emission main surface) on a front side (light emission side) of the second base material 17A. The second base material 17A is formed of a substantially transparent synthetic resin, and specifically, is formed of, for example, a crystalline transparent resin material such as PET being the same as that of the first base material 16A. The second prism 17B is formed of an ultraviolet-curing resin material being substantially transparent and being a type of photo-curable resin material. A manufacturing method of the second prism sheet 17 is similar to the manufacturing method of the first prism sheet 16 described above. The ultraviolet-curing resin material constituting the second prism 17B is, for example, an acrylic resin such as PMMA, and a refractive index of the ultraviolet-curing resin material is set higher than the refractive index of the material of the first prism 16B, and is set to, for example, approximately 1.61.

As illustrated in FIG. 2, the second prism 17B is provided so as to protrude from the main surface of the second base material 17A toward the front side (side opposite to the first prism sheet 16 side) along the Z-axis direction. The second prism 17B has a substantially triangular shape (is substantially mountain shaped) in a cross section taken along the X-axis direction and also extends linearly along the Y-axis direction, and a plurality of the second prisms 17B are continuously disposed side by side with substantially no interval along the X-axis direction on the main surface of the second base material 17A. The second prism 17B includes a pair of inclined surfaces 17B1 and 17B2. Of the pair of inclined surfaces 17B1 and 17B2 in the second prism 17B, the inclined surface on the first LED 13 side in the X-axis direction is a third prism inclined surface (fifth inclined surface) 17B1, and the inclined surface on a side opposite to the third prism inclined surface 17B1 is a fourth prism inclined surface (sixth inclined surface) 17B2. The third prism inclined surface 17B1 has an inclination rising from the first LED 13 side (left side in FIG. 2) in the second prism sheet 17 toward a side opposite (right side in FIG. 2) to the first LED 13 side in the X-axis direction. The third prism inclined surface 17B1 is exposed mainly to light traveling toward the first LED 13 in the X-axis direction, of light incident on the second prism 17B, to refract the light. The fourth prism inclined surface 17B2 has an inclination rising from the side opposite (right side in FIG. 2) to the first LED 13 side in the second prism sheet 17 toward the first LED 13 side (left side in FIG. 2) in the X-axis direction. The fourth prism inclined surface 17B2 is exposed mainly to light traveling away from the first LED 13 in the X-axis direction, of light incident on the second prism 17B, to refract the light. Most of the light refracted by the pair of inclined surfaces 17B1 and 17B2 in the second prism 17B is selectively raised and condensed in the X-axis direction.

Then, as illustrated in FIG. 2, in the second prism 17B, an inclination angle (fifth base angle) θ7 formed by the third prism inclined surface 17B1 with respect to the X-axis direction, and an inclination angle (sixth base angle) θ8 formed by the fourth prism inclined surface 17B2 with respect to the X-axis direction are the same. In other words, the second prism 17B has a symmetric cross-sectional shape, which is an isosceles triangle. Moreover, each of the inclination angles θ7 and θ8 of the third prism inclined surface 17B1 and the fourth prism inclined surface 17B2 with respect to the X-axis direction is smaller than the inclination angle θ4 of the first prism inclined surface 16B1 with respect to the X-axis direction. Specifically, each of the inclination angles θ7 and θ8 of the third prism inclined surface 17B1 and the fourth prism inclined surface 17B2 with respect to the X-axis direction is preferably set within a range from 40° to 50°, and is most preferably set to 45°. In contrast, an angle (third apex angle) θ9 formed by the pair of inclined surfaces 17B1 and 17B2 in the second prism 17B is preferably set within a range from 80° to 100°, and is most preferably set to 90°, that is, a right angle. Note that all the plurality of second prisms 17B aligned along the Y-axis direction have substantially the same height dimension, substantially the same width dimension, substantially the same inclination angle of each of the surfaces 17B1 and 17B2 with respect to the X-axis direction, and the like, and are also arranged such that arrangement intervals between the adjacent second prisms 17B are substantially constant and equal. In addition, it is preferable that the height dimension and the arrangement interval in the second prism 17B differ from the height dimension and the arrangement interval in the first prism 16B, respectively, in terms of suppressing an occurrence of interference fringes called moire.

The first prism sheet 16 and the second prism sheet 17 having the configuration described above can obtain the following actions and effects. In other words, most of the light emitted from the first light guide plate-light emission main surface 14B of the first light guide plate 14 and incident on the first prism sheet 16 is incident on the second prism inclined surface 16B2 of the first prism 16B and refracted, and then, is raised and emitted, or is directed to the first prism inclined surface 16B1. Here, the first prism 16B has the inclination angle θ4 formed with respect to the X-axis direction greater than the inclination angle θ7 of the second prism 17B formed with respect to the X-axis direction. Thus, as compared to when the angles are the same or a magnitude relationship between the angles is reversed, light incident on the first prism sheet 16 is less likely and incident on the first prism inclined surface 16B1. When the incident light on the first prism sheet 16 is incident on the first prism inclined surface 16B1 of the first prism 16B, the light is not raised when the light is emitted from the first prism 16B, and tends to be more likely to be emitted as side lobe light (stray light). Therefore, when the incident light on the first prism sheet 16 becomes difficult to be directly incident on the first prism inclined surface 16B1 of the first prism 16B, an occurrence of side lobe light is suppressed, and, as a result, usage efficiency of light is improved.

Most of the light emitted from the first prism sheet 16 and incident on the second prism sheet 17 is incident on the fourth prism inclined surface 17B2 of the second prism 17B and refracted, and then, is raised and emitted, or is directed to the third prism inclined surface 17B1. Here, the second prism 17B has the inclination angle θ7 formed with respect to the X-axis direction smaller than the inclination angle θ4 of the first prism 16B formed with respect to the X-axis direction. Thus, as compared to when the angles are the same or a magnitude relationship between the angles is reversed, light refracted by the fourth prism inclined surface 17B2 and directed to the third prism inclined surface 17B1 is more likely to be returned to the first prism sheet 16 side by the third prism inclined surface 17B1. As a result, the amount of the light (hereinafter referred to as recursive light) returned from the second prism sheet 17 to the first prism sheet 16 side is increased. This recursive light reaches the second prism sheet 17 again by being reflected or the like inside the backlight device 12, and is raised and emitted by either of the pair of inclined surfaces 17B1 and 17B2 in the second prism 17B, and thus usage efficiency of light is improved. Since an optical path until the recursive light is emitted from the second prism sheet 17 is complicated, a rise angle provided by the second prism 17B is also diversified, thereby improving viewing angle characteristics. As described above, viewing angle characteristics and brightness can be improved.

Figure 3:
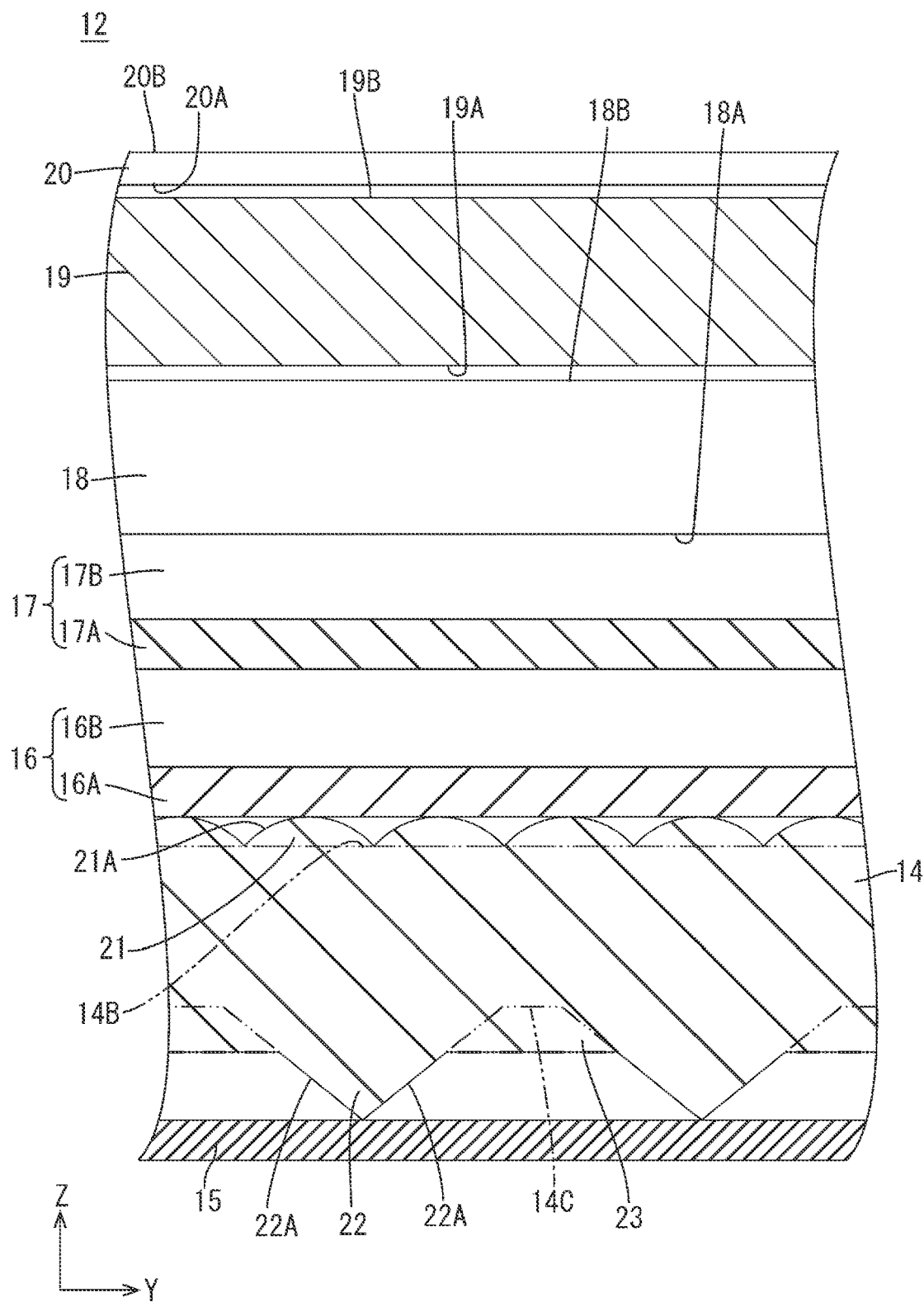
FIG. 3 is a front cross-sectional view of the backlight device.

Next, a detailed structure of the first light guide plate 14 will be described. As illustrated in FIGS. 2 and 3, a first light guide plate lens 21, a second light guide plate lens 22, and a third light guide plate lens 23 are provided on the first light guide plate 14. As illustrated in FIG. 3, the first light guide plate lens 21 is provided on the first light guide plate-light emission main surface 14B of the first light guide plate 14. The first light guide plate lens 21 extends along the X-axis direction, and a plurality of the first light guide plate lenses 21 are disposed side by side along the Y-axis direction. In the present embodiment, the first light guide plate lens 21 is a so-called lenticular lens. The first light guide plate lens 21 has a convex shape protruding from the first light guide plate-light emission main surface 14B to the front side. Specifically, the first light guide plate lens 21 has a semi-circular shape in a cross section taken along the Y-axis direction and a semi-cylindrical shape linearly extending along the X-axis direction, and a surface of the first light guide plate lens 21 is a first circular arc-shaped face 21A. When an angle formed by a tangent line at a base end portion of the first circular arc-shaped face 21A with respect to the Y-axis direction is defined as a "contact angle", a contact angle of the first light guide plate lens 21 is, for example, approximately 62°. All the plurality of first light guide plate lenses 21 aligned along the Y-axis direction have substantially the same contact angle, substantially the same width dimension (arrangement interval), and substantially the same height dimension. In order to provide the first light guide plate lens 21 having such a configuration integrally with the first light guide plate 14, for example, the first light guide plate 14 may be manufactured by injection molding, and a transfer shape for transferring the first light guide plate lens 21 may be formed in advance on a molding face of a forming mold of the first light guide plate 14 for molding the first light guide plate-light emission main surface 14B.

As illustrated in FIG. 3, the second light guide plate lens 22 is provided on the first opposite main surface 14C of the first light guide plate 14. The second light guide plate lens 22 extends along the X-axis direction, and a plurality of the second light guide plate lenses 22 are disposed side by side along the Y-axis direction. In the present embodiment, the second light guide plate lens 22 is a convex-shaped prism protruding from the first opposite main surface 14C to the back side. Specifically, the second light guide plate lens 22 has a substantially triangular shape (is substantially mountain shaped) in a cross section taken along the Y-axis direction, and also extends linearly along the X-axis direction. A width dimension (dimension in the Y-axis direction) of the second light guide plate lens 22 is set constant throughout the entire length in the X-axis direction. The second light guide plate lens 22 has an approximately isosceles triangle shape in the cross section, and includes a pair of first light guide plate inclined surfaces 22A. An apex angle of the second light guide plate lens 22 is preferably set to an obtuse angle (angle greater than 90°), specifically, within a range from 100° to 150°, and is most preferably set to 140°. All the plurality of second light guide plate lenses 22 aligned along the Y-axis direction have substantially the same apex angle, substantially the same width dimension (arrangement interval), and substantially the same height dimension. In the present embodiment, the arrangement interval of the second light guide plate lenses 22 is greater than the arrangement interval of the first light guide plate lenses 21. In order to provide the second light guide plate lens 22 having such a configuration integrally with the first light guide plate 14, for example, the first light guide plate 14 may be manufactured by injection molding, and a transfer shape for transferring the second light guide plate lens 22 may be formed in advance on a molding face of a forming mold of the first light guide plate 14 for molding the first opposite main surface 14C.

According to the first light guide plate 14 having such a configuration, as illustrated in FIG. 3, light propagating inside the first light guide plate 14 is repeatedly reflected by being incident on the first circular arc-shaped face 21A of each of the first light guide plate lenses 21 on the first light guide plate-light emission main surface 14B side in the Z-axis direction, and travels in a zigzag manner substantially along the X-axis direction. On the other hand, light propagating inside the first light guide plate 14 is repeatedly reflected by being incident on the pair of first light guide plate inclined surfaces 22A of each of the second light guide plate lenses 22 on the first opposite main surface 14C side in the Z-axis direction, and travels in a zigzag manner substantially along the X-axis direction. In this way, light propagating inside the first light guide plate 14 is restricted from spreading in the Y-axis direction, and thus unevenness of darkness and brightness is less likely to occur between a vicinity of the first LED 13 and surroundings thereof in the Y-axis direction.

As illustrated in FIG. 2, the third light guide plate lens 23 is provided on the first opposite main surface 14C of the first light guide plate 14. A plurality of the third light guide plate lenses 23 are disposed side by side at an interval along the X-axis direction. The third light guide plate lens 23 protrudes from the first opposite main surface 14C toward the back side along the Z-axis direction. The third light guide plate lens 23 includes a second light guide plate inclined surface 23A disposed on a side opposite (right side in FIG. 2) to the first LED 13 side in the X-axis direction, a third light guide plate inclined surface 23B disposed on the first LED 13 side (left side in FIG. 2) in the X-axis direction, and a fourth light guide plate inclined surface 23C located between the second light guide plate inclined surface 23A and the third light guide plate inclined surface 23B. The second light guide plate inclined surface 23A has an inclination rising from the first LED 13 side (left side in FIG. 2) of the first light guide plate 14 in the X-axis direction toward a side opposite (right side in FIG. 2) to the first LED 13 side. The third light guide plate inclined surface 23B has an inclination rising from the side opposite (right side in FIG. 2) to the first LED 13 side of the first light guide plate 14 in the X-axis direction toward the first LED 13 side (left side in FIG. 2). The fourth light guide plate inclined surface 23C has an inclination rising from the first LED 13 side (left side in FIG. 2) in the X-axis direction in the first light guide plate 14 toward the side opposite (right side in FIG. 2) to the first LED 13 side.

As illustrated in FIG. 2, the second light guide plate inclined surface 23A and the third light guide plate inclined surface 23B reflect light propagating inside the first light guide plate 14, raise the light toward the front side so as to be at an angle close to the Z-axis direction, and can thus promote emission from the first light guide plate-light emission main surface 14B. Specifically, the second light guide plate inclined surface 23A mainly functions to reflect and raise light traveling away from the first LED 13 in the X-axis direction. On the other hand, the third light guide plate inclined surface 23B mainly functions to reflect and raise light traveling toward the first LED 13 in the X-axis direction. The second light guide plate inclined surface 23A has a gradient in which a distance from the first light guide plate-light emission main surface 14B (a portion in which the third light guide plate lens 23 is not installed) becomes smaller while going away from the first LED 13 in the X-axis direction. The second light guide plate inclined surface 23A has an inclination angle of, for example, approximately 8° with respect to the X-axis direction. The third light guide plate inclined surface 23B has a gradient in which a distance from the first light guide plate-light emission main surface 14B becomes larger while going away from the first LED 13 in the X-axis direction, that is, a gradient opposite to that of the second light guide plate inclined surface 23A. The third light guide plate inclined surface 23B has a steep, near-vertical gradient with an inclination angle of, for example, approximately 80° with respect to the X-axis direction, and the inclination angle is greater than the inclination angle of the second light guide plate inclined surface 23A.

Figure 4:
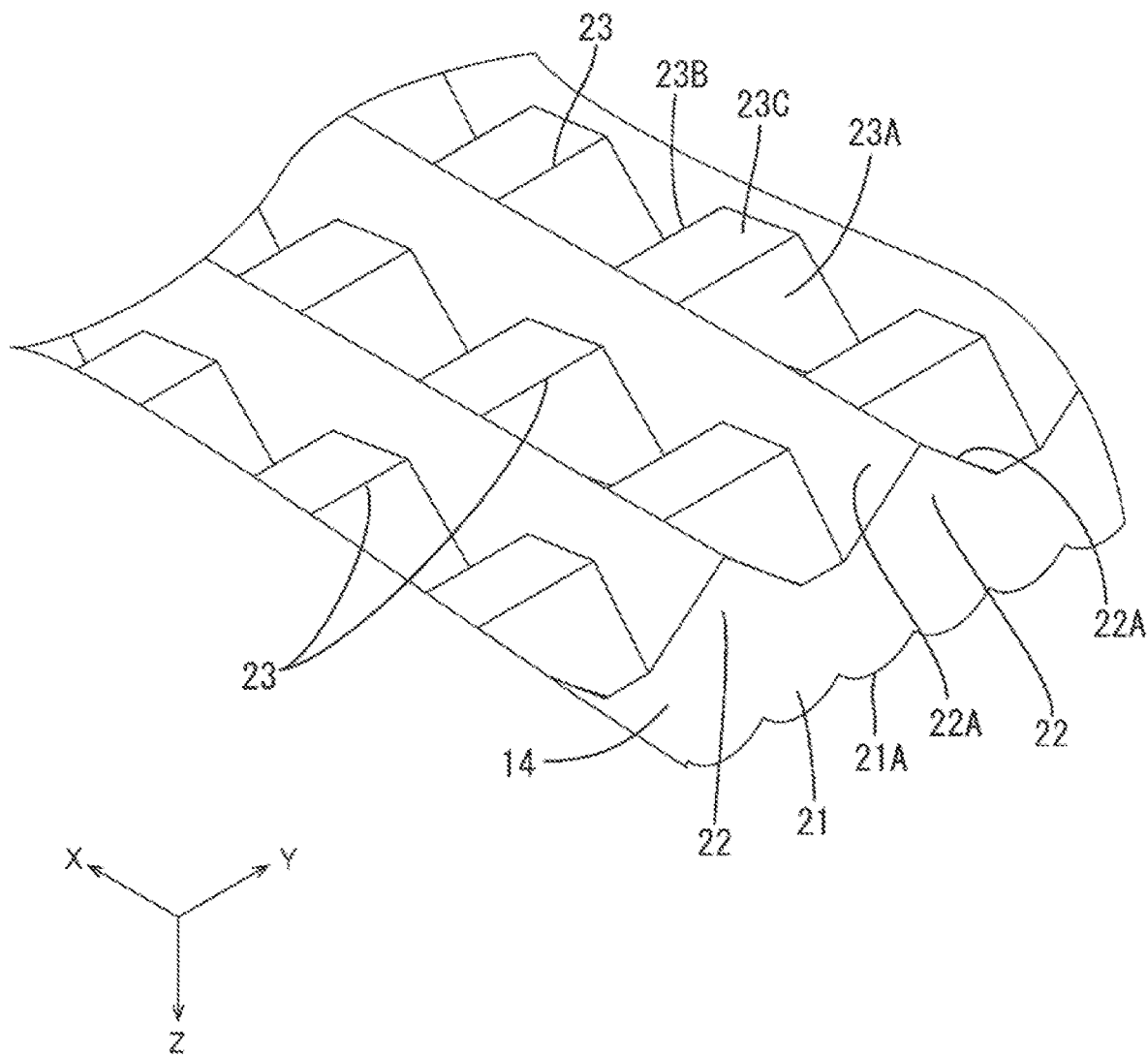
FIG. 4 is a perspective view when a first light guide plate constituting the backlight device is viewed from a first opposite main surface side.
Figure 5:
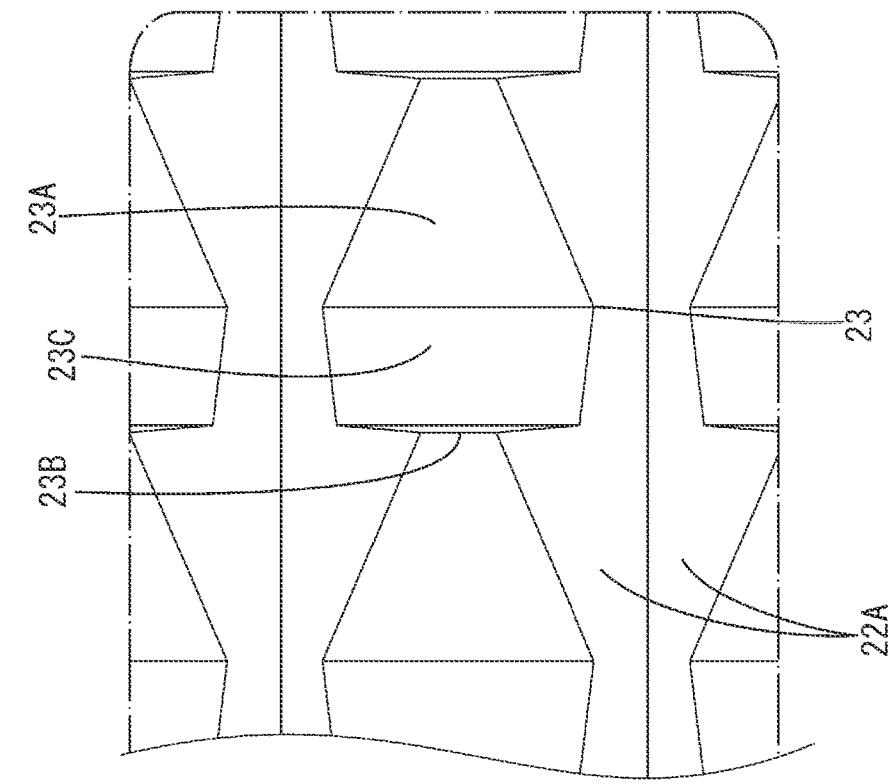
FIG. 5 is a bottom view illustrating a configuration on the first opposite main surface of the first light guide plate.
Figure 5:
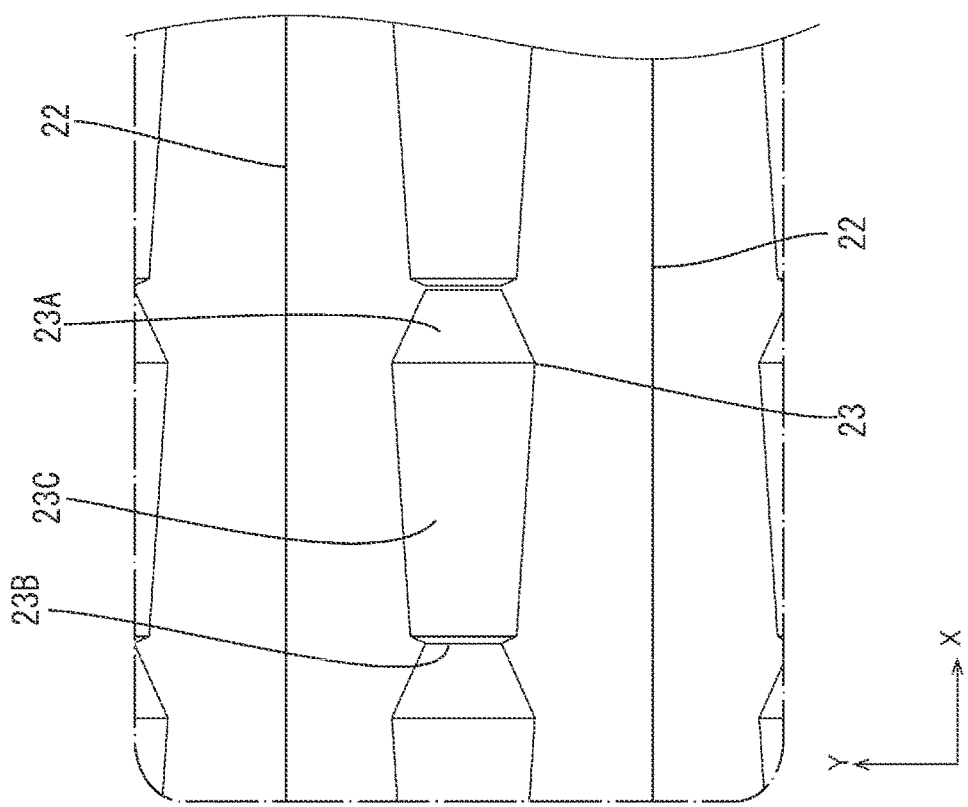

Further, as illustrated in FIGS. 2, 4, and 5, the plurality of third light guide plate lenses 23 aligned along the X-axis direction are designed such that a height dimension (dimension in the Z-axis direction) and a length dimension (dimension in the X-axis direction) each increase while going away from the first LED 13 in the X-axis direction. More specifically, when comparing the third light guide plate lens 23 closer to the first LED 13 in the X-axis direction and the third light guide plate lens 23 farther from the first LED 13 in the X-axis direction, each area of the second light guide plate inclined surface 23A and the third light guide plate inclined surface 23B of the latter is larger than that of the former. In this way, on a side closer to the first LED 13 in the X-axis direction, light is less likely and incident on the second light guide plate inclined surface 23A and the third light guide plate inclined surface 23B of the third light guide plate lens 23, and light emission is suppressed, but on a side farther from the first LED 13 in the X-axis direction, light is more likely and incident on the second light guide plate inclined surface 23A and the third light guide plate inclined surface 23B of the third light guide plate lens 23, and light emission is promoted. As a result, the amount of light emitted from the first light guide plate-light emission main surface 14B is made uniform between the first LED 13 side and the side opposite to the first LED 13 side in the X-axis direction.

As illustrated in FIG. 2, in the fourth light guide plate inclined surface 23C, an end portion on the side opposite (right side in FIG. 2) to the first LED 13 side in the X-axis direction is connected to the second light guide plate inclined surface 23A, and an end portion on the first LED 13 side (left side in FIG. 2) in the X-axis direction is connected to the third light guide plate inclined surface 23B. The fourth light guide plate inclined surface 23C has a gradient in which a distance from the first light guide plate-light emission main surface 14B (a portion in which the third light guide plate lens 23 is not installed) becomes larger while going away from the first LED 13 in the X-axis direction. In other words, the fourth light guide plate inclined surface 23C has the gradient similar to that of the third light guide plate inclined surface 23B. The fourth light guide plate inclined surface 23C has an inclination angle of, for example, approximately 1.4° with respect to the X-axis direction, and the inclination angle is smaller than both of the inclination angles of the second light guide plate inclined surface 23A and the third light guide plate inclined surface 23B. The fourth light guide plate inclined surface 23C having such a configuration reflects light traveling away from the first LED 13 inside the first light guide plate 14, and thus the light is directed to the first light guide plate-light emission main surface 14B side, but an angle of incidence of the light with respect to the first light guide plate-light emission main surface 14B does not exceed a critical angle. Therefore, the light is totally reflected by the first light guide plate-light emission main surface 14B, and is guided so as to go farther away from the first LED 13. In this way, emission light from the first light guide plate-light emission main surface 14B is less likely to be biased toward the first LED 13 side in the X-axis direction. As described above, the first light guide plate 14 is configured such that the inclination angle with respect to the X-axis direction increases in the order of the fourth light guide plate inclined surface 23C, the second light guide plate inclined surface 23A, and the third light guide plate inclined surface 23B. Further, a plurality of the fourth light guide plate inclined surfaces 23C aligned along the X-axis direction are designed such that the length dimension decreases while going away from the first LED 13 in the X-axis direction. The reason is that the length dimension of the third light guide plate lens 23 increases while going away from the first LED 13 in the X-axis direction, and an occupied range of the third light guide plate lens 23 increases.

As illustrated in FIGS. 3 to 5, the third light guide plate lens 23 having the configuration described above is sandwiched and disposed between two second light guide plate lenses 22 that are adjacent to each other in the Y-axis direction. Therefore, the third light guide plate lens 23 is repeatedly disposed in an alternating manner with the second light guide plate lens 22A in the Y-axis direction. In the third light guide plate lens 23, a maximum value of a protrusion dimension (height dimension) from the first opposite main surface 14C is set smaller than a protrusion dimension of the second light guide plate lens 22 from the first opposite main surface 14C. Therefore, even the third light guide plate lens 23 located on a farthest side from the first LED 13 in the X-axis direction does not protrude farther toward the back side than the second light guide plate lens 22.

Herein, the liquid crystal display device 10 for vehicle application may be located and installed in front of a passenger seat of a passenger vehicle, for example. In that case, it may be required to restrict a viewing angle such that while a display image of the liquid crystal display device 10 can be visually recognized from a passenger seat, the display image of the liquid crystal display device 10 cannot be visually recognized from a driver seat. As illustrated in FIG. 1, in order to respond to such a request, the backlight device 12 according to the present embodiment includes at least a first louver (first sheet) 18 disposed on a front side of the second prism sheet 17, a linear Fresnel lens sheet (second sheet) 19 disposed on a front side of the first louver 18, and a second louver (third sheet) 20 disposed on a front side of the linear Fresnel lens sheet 19 in addition to each of the configurations described above.

Figure 6:
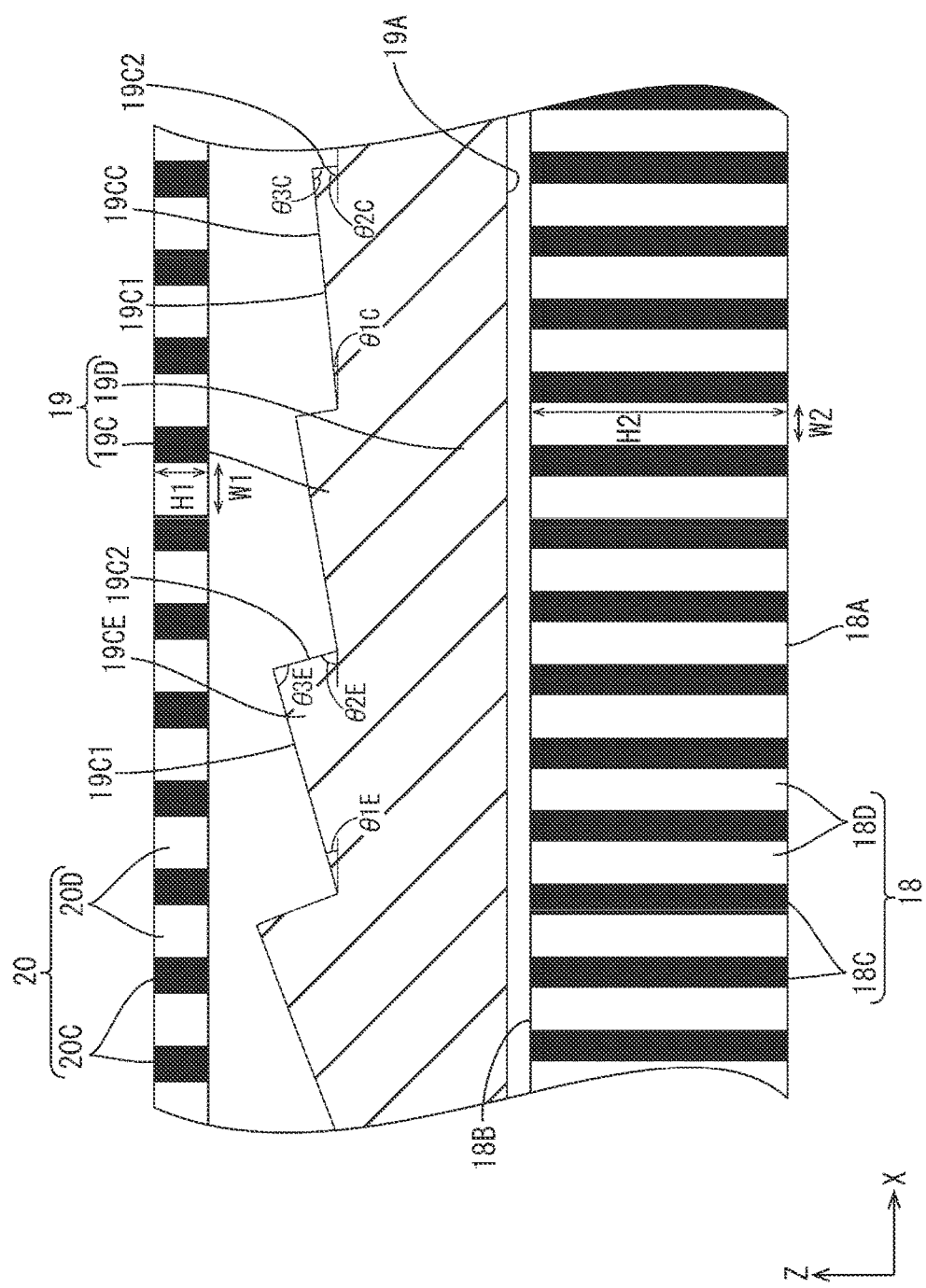
FIG. 6 is a side cross-sectional view illustrating a first louver, a linear Fresnel lens sheet, and a second louver constituting the backlight device.

A configuration of the first louver 18, the linear Fresnel lens sheet 19, and the second louver 20 will be described by appropriately using FIGS. 1, 2, and 6. FIG. 6 is an enlarged cross-sectional view of the first louver 18, the linear Fresnel lens sheet 19, and the second louver 20 of component parts of the backlight device 12. As illustrated in FIG. 1, the first louver 18, the linear Fresnel lens sheet 19, and the second louver 20 each include a main surface having a sheet shape parallel to each of the main surfaces of the liquid crystal panel 11, the first light guide plate 14, and the like. Note that the main surface of the first louver 18, the linear Fresnel lens sheet 19, and the second louver 20 is parallel to the X-axis direction and the Y-axis direction, and a normal direction (thickness direction) of the main surface coincides with the Z-axis direction. The first louver 18 and the second louver 20 have a function of restricting an emission angle range of light in the X-axis direction. The linear Fresnel lens sheet 19 has a function of selectively condensing light in the X-axis direction.

As illustrated in FIG. 1, the first louver 18 includes a first light entering main surface 18A on the back side, and a first light emission main surface 18B on the front side. The first light entering main surface 18A faces a main surface of the second prism sheet 17 on a light emission side. The first light emission main surface 18B faces a second light entering main surface 19A of the linear Fresnel lens sheet 19 described below. As illustrated in FIG. 2, the first louver 18 includes a first light blocking portion 18C that blocks light, and a first light-transmitting portion 18D that transmits light. The first light blocking portion 18C is formed of, for example, a light blocking resin material (light blocking material) that exhibits a black color and blocks light. The first light blocking portion 18C has a layer shape extending along the Y-axis direction and the Z-axis direction, and a plurality of the first light blocking portions 18C are disposed side by side at an interval in the X-axis direction. The first light-transmitting portion 18D is formed of a light-transmissive resin material (light-transmissive material) that is substantially transparent and transmits light. The first light-transmitting portion 18D has a layer shape extending along the Y-axis direction and the Z-axis direction, and a plurality of the first light-transmitting portions 18D are disposed side by side at an interval in the X-axis direction. The plurality of first light blocking portions 18C and the plurality of first light-transmitting portions 18D are repeatedly and alternately disposed side by side in the X-axis direction. Therefore, the first light-transmitting portion 18D is interposed between two first light blocking portions 18C that are adjacent to each other at an interval in the X-axis direction, and the first light blocking portion 18C is interposed between two first light-transmitting portions 18D that are adjacent to each other at an interval in the X-axis direction. Light incident on the first light entering main surface 18A of the first louver 18 is transmitted through the first light-transmitting portion 18D disposed between the two first light blocking portions 18C that are adjacent to each other in the X-axis direction, and is emitted from the first light emission main surface 18B. An emission angle of emission light from the first light emission main surface 18B in the X-axis direction is restricted by the two first light blocking portions 18C that are adjacent to each other in the X-axis direction. Note that emission light from the first light emission main surface 18B has an emission angle that is not restricted by the first louver 18 in the Y-axis direction. An emission angle range of emission light from the first light emission main surface 18B in the X-axis direction is defined by two straight lines that diagonally connect each end portion in the Z-axis direction of the two first light blocking portions 18C that sandwich the first light-transmitting portion 18D. An emission angle range of transmitted light of the first light-transmitting portion 18D in the X-axis direction changes according to a ratio between a width W1 and a height H1 of the first light-transmitting portion 18D (see FIG. 6). Further, the first louver 18 includes a pair of sheet carriers that sandwich and carry the plurality of first light blocking portions 18C and the plurality of first light-transmitting portions 18D from the front side and the back side. The sheet carrier is formed of a light-transmissive resin material that is substantially transparent and transmits light. The sheet carrier extends all over the first louver 18, and collectively holds the plurality of first light blocking portions 18C and the plurality of first light-transmitting portions 18D.

As illustrated in FIG. 1, the linear Fresnel lens sheet 19 includes the second light entering main surface 19A on the back side, and a second light emission main surface 19B on the front side. The second light entering main surface 19A faces the first light emission main surface 18B of the first louver 18. The second light emission main surface 19B faces a third light entering main surface 20A of the second louver 20 described below. The linear Fresnel lens sheet 19 includes a flat base material 19D, and a first lens 19C provided on the main surface (second light emission main surface 19B) on a front side of the base material 19D. The linear Fresnel lens sheet 19 is formed of a substantially transparent synthetic resin. Specifically, the entire linear Fresnel lens sheet 19 can be formed of an acrylic resin material such as, for example, PMMA. Further, the base material 19D of the linear Fresnel lens sheet 19 is formed of PET, and the first lens 19C can be formed of an ultraviolet-curing resin material. In that case, similarly to a manufacturing method of the first prism sheet 16 and the like, an uncured ultraviolet-curing resin material is filled into a mold for molding, and the base material 19D is also applied to an opening end of the mold to dispose the uncured ultraviolet-curing resin material so as to contact the main surface on the front side, and in this state, the ultraviolet-curing resin material is irradiated with ultraviolet rays through the base material 19D, and the first lens 19C can be integrally provided with the base material 19D.

As illustrated in FIG. 1, the first lens 19C protrudes from the base material 19D toward the front side along the Z-axis direction. The first lens 19C has a triangular shape in a cross section taken along the X-axis direction, and extends linearly along the Y-axis direction. A width dimension (dimension in the X-axis direction) of the first lens 19C is set constant throughout the entire length in the Y-axis direction. A plurality of the first lenses 19C are disposed side by side along the X-axis direction in the base material 19D. In the plurality of first lenses 19C, a height and the like change according to a position in the base material 19D in the X-axis direction. Specifically, among the plurality of first lenses 19C, the first lens 19C located on an end side in the base material 19D in the X-axis direction (an end side lens 19CE described below) has a protruding height from the base material 19D greater than the first lens 19C located on a central side (a central side lens 19CC described below). As the plurality of first lenses 19C approach both end positions from a central position in the base material 19D in the X-axis direction, the protruding height from the base material 19D gradually increases. The plurality of first lenses 19C have a symmetric shape around the central position in the base material 19D in the X-axis direction. In this way, the plurality of first lenses 19C are a so-called "linear Fresnel lens".

As illustrated in FIGS. 1 and 2, the first lens 19C includes a pair of inclined surfaces 19C1 and 19C2. Of the pair of inclined surfaces 19C1 and 19C2 in the first lens 19C, the inclined surface on the end side in the linear Fresnel lens sheet 19 in the X-axis direction is the first inclined surface 19C1, and the inclined surface on the central side is the second inclined surface 19C2. The first inclined surface 19C1 has an inclination rising from the end side toward the central side in the linear Fresnel lens sheet 19 in the X-axis direction. The second inclined surface 19C2 has an inclination rising from the central side toward the end side in the linear Fresnel lens sheet 19 in the X-axis direction. In the first lens 19C located closer to the first LED 13 side (left side in FIG. 1) than the central position in the linear Fresnel lens sheet 19 in the X-axis direction, the first inclined surface 19C1 is located on the left side in FIG. 1 with respect to a top portion, and the second inclined surface 19C2 is located on the right side in FIG. 1. In the first lens 19C located closer to a side opposite (right side in FIG. 1) to the first LED 13 than the central position in the linear Fresnel lens sheet 19 in the X-axis direction, the first inclined surface 19C1 is located on the right side in FIG. 1 with respect to the top portion, and the second inclined surface 19C2 is located on the left side in FIG. 1. Note that FIG. 2 illustrates the first lens 19C located closer to the first LED 13 than the central position in the linear Fresnel lens sheet 19 in the X-axis direction.

As illustrated in FIG. 2, when light incident on the first lens 19C is incident on the first inclined surface 19C1 and refracted, the light is directed and travels to the central side of the linear Fresnel lens sheet 19 in the X-axis direction. In other words, the first inclined surface 19C1 can provide an anisotropy refraction action of selectively condensing light in the X-axis direction. The first lens 19C includes the second inclined surface 19C2 in addition to the first inclined surface 19C1, and thus, as compared to when the second inclined surface 19C2 is a vertical surface perpendicular to the X-axis direction, processing of the plurality of first lenses 19C in manufacturing the linear Fresnel lens sheet 19 is facilitated. On the other hand, when light incident on the first lens 19C is incident on the second inclined surface 19C2 and refracted, the light is directed and travels to the end side of the linear Fresnel lens sheet 19 in the X-axis direction, and tends to be more likely to be emitted as side lobe light (stray light). In contrast, the first lens 19C has an inclination angle (angle, first bottom angle) θ1 of the first inclined surface 19C1 with respect to the X-axis direction smaller than an inclination angle (angle, second bottom angle) θ2 of the second inclined surface 19C2 with respect to the X-axis direction. Therefore, most of the light incident on the first lens 19C is incident on the first inclined surface 19C1 and provided with a condensing action, and little light is incident on the second inclined surface 19C2. In this way, the first lens 19C has an asymmetrical cross-sectional shape, which is a scalene triangle.

As illustrated in FIG. 2, the second louver 20 includes the third light entering main surface 20A on the back side, and a third light emission main surface 20B on the front side. The third light entering main surface 20A faces the second light emission main surface 19B of the linear Fresnel lens sheet 19. The second louver 20 includes a second light blocking portion 20C that blocks light, and a second light-transmitting portion 20D that transmits light. The second light blocking portion 20C is formed of, for example, a light blocking resin material (light blocking material) that exhibits a black color and blocks light. The second light blocking portion 20C has a layer shape extending along the Y-axis direction and the Z-axis direction, and a plurality of the second light blocking portions 20C are disposed side by side at an interval in the X-axis direction. The second light-transmitting portion 20D is formed of a light-transmissive resin material (light-transmissive material) that is substantially transparent and transmits light. The second light-transmitting portion 20D has a layer shape extending along the Y-axis direction and the Z-axis direction, and a plurality of the second light-transmitting portions 20D are disposed side by side at an interval in the X-axis direction. The plurality of second light blocking portions 20C and the plurality of second light-transmitting portions 20D are repeatedly and alternately disposed side by side in the X-axis direction. Therefore, the second light-transmitting portion 20D is interposed between two second light blocking portions 20C that are adjacent to each other at an interval in the X-axis direction, and the second light blocking portion 20C is interposed between two second light-transmitting portions 20D that are adjacent to each other at an interval in the X-axis direction. Light incident on the third light entering main surface 20A of the second louver 20 is transmitted through the second light-transmitting portion 20D disposed between the two second light blocking portions 20C that are adjacent to each other in the X-axis direction, and is emitted from the third light emission main surface 20B. An emission angle of emission light from the third light emission main surface 20B in the X-axis direction is restricted by the two second light blocking portions 20C that are adjacent to each other in the X-axis direction. Note that emission light from the third light emission main surface 20B has an emission angle that is not restricted by the second louver 20 in the Y-axis direction. An emission angle range of the emission light from the third light emission main surface 20B in the X-axis direction is defined by two straight lines that diagonally connect each end portion in the Z-axis direction of the two second light blocking portions 20C that sandwich the second light-transmitting portion 20D. An emission angle range of transmitted light of the second light-transmitting portion 20D in the X-axis direction changes according to a ratio between a width W2 and a height H2 of the second light-transmitting portion 20D. Further, the second louver 20 includes a pair of sheet carriers that sandwich and carry the plurality of second light blocking portions 20C and the plurality of second light-transmitting portions 20D from the front side and the back side. The sheet carrier is formed of a light-transmissive resin material that is substantially transparent and transmits light. The sheet carrier extends all over the second louver 20, and collectively holds the plurality of second light blocking portions 20C and the plurality of second light-transmitting portions 20D.

As illustrated in FIG. 6, the first louver 18 has a ratio acquired by dividing the width W1 of the first light-transmitting portion 18D by the height H1 smaller than a ratio acquired by dividing the width W2 of the second light-transmitting portion 20D by the height H2. According to this configuration, a maximum absolute value of an angle formed by light transmitted through the first light-transmitting portion 18D with respect to the Z-axis direction (normal direction of the first light emission main surface 18B) is smaller than a maximum absolute value of an angle formed by light transmitted through the second light-transmitting portion 20D with respect to the Z-axis direction (normal direction of the third light emission main surface 20B). In this way, the light emitted from the first light emission main surface 18B and incident on the second light entering main surface 19A of the linear Fresnel lens sheet 19 includes a lot of light close to the Z-axis direction. Therefore, the light refracted by the first inclined surface 19C1 of the first lens 19C provided in the linear Fresnel lens sheet 19 is effectively provided with directivity toward the central side in the X-axis direction. Further, the light incident on the first light entering main surface 18A of the first louver 18 has less side lobe light by the second prism sheet 17 and also has higher usage efficiency by including the recursive light, and thus the amount of transmitted light of the first light-transmitting portion 18D is sufficiently ensured, and the amount of light blocked by the first light blocking portion 18C also decreases. In this way, it is suitable to improve brightness according to emission light of the backlight device 12, and the like.

On the other hand, as illustrated in FIG. 6, the second louver 20 has a ratio acquired by dividing the width W2 of the second light-transmitting portion 20D by the height H2 greater than a ratio acquired by dividing the width W1 of the first light-transmitting portion 18D by the height H1. According to this configuration, a maximum absolute value of an angle formed by light transmitted through the second light-transmitting portion 20D with respect to the Z-axis direction (normal direction of the third light emission main surface 20B) is greater than a maximum absolute value of an angle formed by light transmitted through the first light-transmitting portion 18D with respect to the Z-axis direction (normal direction of the first light emission main surface 18B). In this way, a situation where light provided with the anisotropy refraction action by the linear Fresnel lens sheet 19 has an emission angle excessively restricted by the second louver 20 can be avoided. Thus, the anisotropy refraction action provided by the linear Fresnel lens sheet 19 is sufficiently reflected in emission light from the third light emission main surface 20B. Therefore, brightness of emission light is made uniform between a central side portion and both end side portions of the third light emission main surface 20B in the X-axis direction. In this way, a brightness distribution according to emission light of the backlight device 12 is made uniform. The emission light of the backlight device 12 according to the present embodiment has an emission angle range restricted by the second louver 20, and has a brightness distribution further made uniform. Therefore, when the liquid crystal display device 10 according to the present embodiment is located and installed in front of a passenger seat of a passenger vehicle, a display image of the liquid crystal display device 10 cannot be visually recognized from a driver seat, and the display image having uniform brightness regardless of a position of a screen of the liquid crystal display device 10 in the X-axis direction can be further visually recognized from the passenger seat. Further, an emission angle of the emission light from the third light emission main surface 20B is restricted by the two second light blocking portions 20C. Therefore, even when side lobe light caused by the second inclined surface 19C2 of the first lens 19C occurs, the side lobe light is blocked by the second light blocking portion 20C of the second louver 20, and is thus less likely to be emitted from the third light emission main surface 20B. In this way, the side lobe light that may occur in the emission light of the backlight device 12 can be sufficiently reduced.

Specifically, as illustrated in FIG. 6, the first louver 18 has a ratio acquired by dividing the width W1 of the first light-transmitting portion 18D by the height H1 equal to "tan 10°". In this way, a maximum absolute value of an angle formed by light transmitted through the first light-transmitting portion 18D with respect to the Z-axis direction is 10°. As compared to when a ratio acquired by dividing a width of the first light-transmitting portion 18D by a height is greater than "tan 10°", the light supplied to the linear Fresnel lens sheet 19 includes a lot of light incident on the first inclined surface 19C1 of the first lens 19C at a preferable angle of incidence. In this way, the emission light of the linear Fresnel lens sheet 19 is effectively provided with directivity toward the central side in the X-axis direction by the first inclined surface 19C1 of the first lens 19C. Further, as compared to when a ratio acquired by dividing a width of the first light-transmitting portion 18D by a height is smaller than "tan 10°", the amount of light blocked by the first light blocking portion 18C decreases, and usage efficiency of light is improved.

As illustrated in FIG. 6, the second louver 20 has the ratio acquired by dividing the width W2 of the second light-transmitting portion 20D by the height H2 equal to "tan 45°". In this way, a maximum absolute value of an angle formed by light transmitted through the second light-transmitting portion 20D with respect to the Z-axis direction is 45°. As compared to when a ratio acquired by dividing a width of the second light-transmitting portion 20D by a height is greater than "tan 45°", side lobe light can be reduced. Further, as compared to when a ratio acquired by dividing a width of the second light-transmitting portion 20D by a height is smaller than "tan 45°", light provided with the anisotropy refraction action by the linear Fresnel lens sheet 19 has an emission angle less likely to be excessively restricted by the second louver 20. In this way, a brightness distribution according to emission light of the second louver 20 is made uniform.

A detailed configuration of the linear Fresnel lens sheet 19 will be described. As illustrated in FIG. 6, the plurality of first lenses 19C aligned along the X-axis direction are configured such that the inclination angle $\theta 1$ of the first inclined surface 19C1 with respect to the X-axis direction changes according to a position in the X-axis direction. Specifically, the plurality of first lenses 19C include the central side lens 19CC, and the end side lens 19CE located closer to the end side in the X-axis direction in the linear Fresnel lens sheet 19 than the central side lens 19CC. When any first lens 19C disposed in a position other than both ends in the X-axis direction among the plurality of first lenses 19C is the "central side lens 19CC", the first lens 19C located closer to the end side in the X-axis direction than the "central side lens 19CC" is the "end side lens 19CE". Then, an angle $\theta 1E$ formed by the first inclined surface 19C1 of the end side lens 19CE with respect to the X-axis direction is greater than an angle $\theta 1C$ of the first inclined surface 19C1 of the central side lens 19CC with respect to the X-axis direction. According to such a configuration, the anisotropy refraction action provided to light by the first inclined surface 19C1 of the end side lens 19CE is stronger than the anisotropy refraction action provided to light by the first inclined surface 19C1 of the central side lens 19CC. In other words, in the second light emission main surface 19B of the linear Fresnel lens sheet 19, emission light from an end side portion in the X-axis direction has stronger directivity toward the central side in the X-axis direction than emission light from a central side portion in the X-axis direction. Since an emission angle of emission light excessively restricted is avoided in the second louver 20 on which emission light from the second light emission main surface 19B is incident, brightness of the emission light is made uniform between a central side portion and both end side portions of the third light emission main surface 20B of the second louver 20 in the X-axis direction.

As illustrated in FIG. 6, the plurality of first lenses 19C aligned along the X-axis direction have the same apex angle (first apex angle) $\theta 3$. In other words, an apex angle $\theta 3C$ of the central side lens 19CC is equal to an apex angle $\theta 3E$ of the end side lens 19CE. According to such a configuration, processing of a mold used for molding is facilitated when the linear Fresnel lens sheet 19 is manufactured by resin molding. Then, the plurality of first lenses 19C are configured such that an inclination angle $\theta 2$ of the second inclined surface 19C2 with respect to the X-axis direction changes according to a position in the X-axis direction. An angle $\theta 2E$ formed by the second inclined surface 19C2 of the end side lens 19CE with respect to the X-axis direction is smaller than an angle $\theta 2C$ of the second inclined surface 19C2 of the central side lens 19CC with respect to the X-axis direction. According to this configuration, side lobe light caused by the second inclined surface 19C2 of the end side lens 19CE tends to be greater than side lobe light caused by the second inclined surface 19C2 of the central side lens 19CC. In contrast, since an emission angle of emission light from the third light emission main surface 20B is restricted by the two second light blocking portions 20C provided in the second louver 20, the side lobe light caused by the second inclined surface 19C2 of the end side lens 19CE can be sufficiently reduced.

As illustrated in FIG. 6, the plurality of first lenses 19C have a constant apex angle $\theta 3$ of 110°. The plurality of first lenses 19C have the inclination angle $\theta 1$ of the first inclined surface 19C1 with respect to the X-axis direction in a range from 0° to 24°, and have the inclination angle $\theta 2$ of the second inclined surface 19C2 with respect to the X-axis direction in a range from 46° to 70°. Specifically, in the first lens 19C (central side lens 19CC) located at the center of the linear Fresnel lens sheet 19 in the X-axis direction among the plurality of first lenses 19C, the inclination angle $\theta 1$ ($\theta 1C$) of the first inclined surface 19C1 with respect to the X-axis direction is approximately 0°, the inclination angle $\theta 2$ ($\theta 2C$) of the second inclined surface 19C2 with respect to the X-axis direction is approximately 70°, and the apex angle $\theta 3$ ($\theta 3C$) is 110°. In contrast, in the first lens 19C (end side lens 19CE) located at both ends of the linear Fresnel lens sheet 19 in the X-axis direction among the plurality of first lenses 19C, the inclination angle $\theta 1$ ($\theta 1E$) of the first inclined surface 19C1 with respect to the X-axis direction is approximately 24°, the inclination angle $\theta 2$ ($\theta 2E$) of the second inclined surface 19C2 with respect to the X-axis direction is approximately 46°, and the apex angle $\theta 3$ ($\theta 3E$) is 110°.

Figure 7:
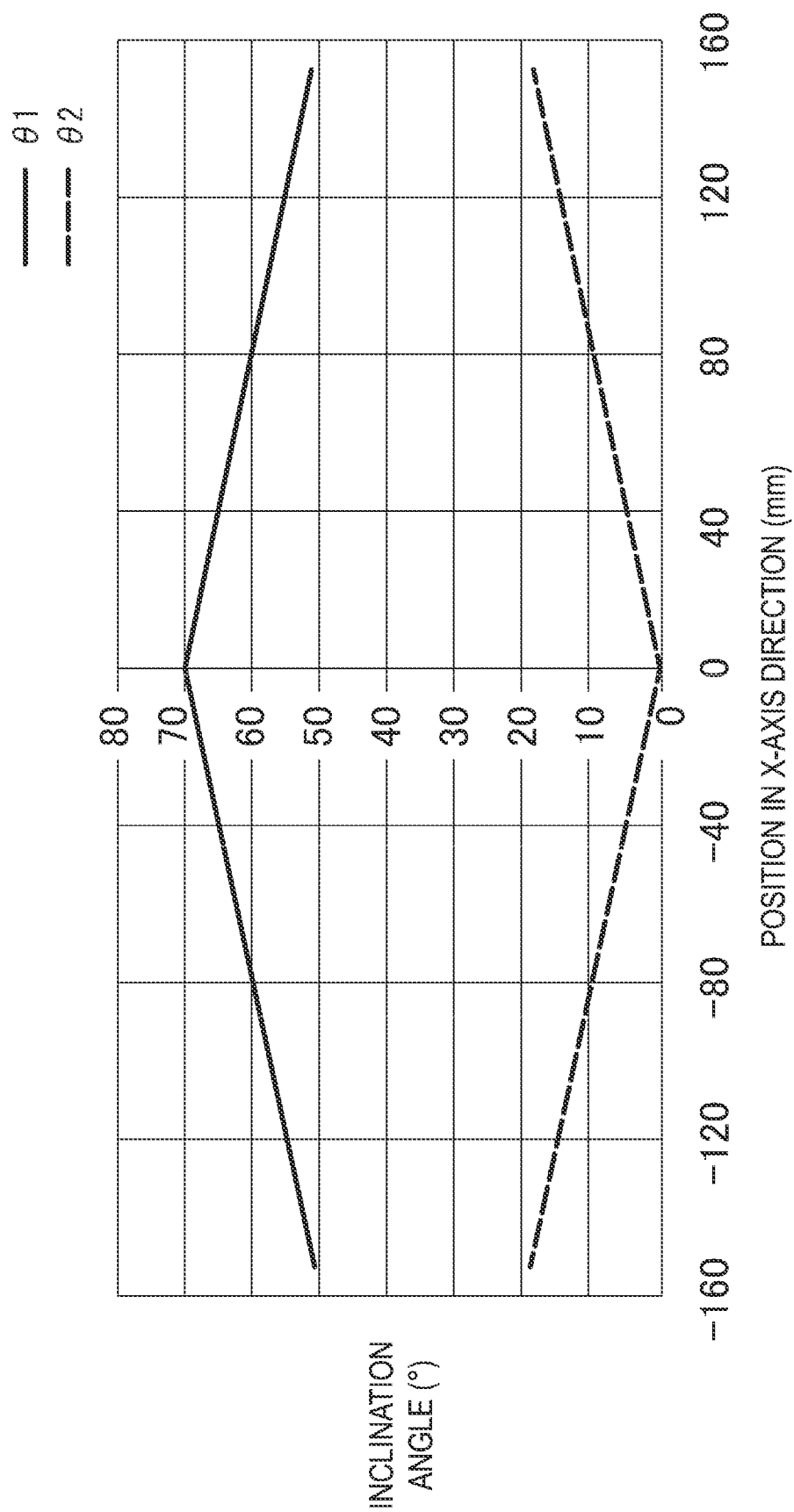
FIG. 7 is a graph showing a relationship between a position in the X-axis direction in the linear Fresnel lens sheet, and an inclination angle $\theta 1$ and an inclination angle $\theta 2$ of a first lens.

A relationship between a position of the linear Fresnel lens sheet 19 in the X-axis direction, and the inclination angle $\theta 1$ and the inclination angle $\theta 2$ of the first lens 19C is as shown in FIG. 7. FIG. 7 is a graph in which a horizontal axis is a position (in units of "mm") in the X-axis direction in the linear Fresnel lens sheet 19, and a vertical axis is the inclination angle $\theta 1$ and the inclination angle $\theta 2$ (in units of "°"). A reference position (0 mm) of the horizontal axis in FIG. 7 is a central position in the X-axis direction. A solid line indicated in FIG. 7 is a graph of the inclination angle $\theta 1$, and a dashed line is a graph of the inclination angle $\theta 2$. Note that FIG. 7 shows the linear Fresnel lens sheet 19 having a length in the X-axis direction of 300 mm. According to FIG. 7, in the plurality of first lenses 19C, the inclination angle $\theta 1$ of the first inclined surface 19C1 with respect to the X-axis direction changes so as to continuously and gradually decrease from the central position toward both end positions in the X-axis direction. In the plurality of first lenses 19C, the inclination angle θ2 of the second inclined surface 19C2 with respect to the X-axis direction changes so as to continuously and gradually increase from the central position toward both end positions in the X-axis direction.

When the angle θ1 formed by the first inclined surface 19C1 with respect to the X-axis direction is greater than 24° and the angle θ2 formed by the second inclined surface 19C2 with respect to the X-axis direction is smaller than 46°, side lobe light that is difficult to block in the second light blocking portion 20C of the second louver 20 may become excessive. Further, when the angle θ1 formed by the first inclined surface 19C1 with respect to the X-axis direction is smaller than 0° and the angle θ2 formed by the second inclined surface 19C2 with respect to the X-axis direction is greater than 70°, side lobe light that is difficult to block in the second light blocking portion 20C of the second louver 20 may also become excessive. In this regard, as described above, in the plurality of first lenses 19C, when the angle θ1 formed by the first inclined surface 19C1 with respect to the X-axis direction is in a range from 0° to 24° and the angle θ2 formed by the second inclined surface 19C2 with respect to the X-axis direction is in a range from 46° to 70°, side lobe light that is difficult to block in the second light blocking portion 20C of the second louver 20 can be sufficiently suppressed.

Here, in order to validate an advantage of the backlight device 12 and the liquid crystal display device 10 according to the present embodiment, the following Comparative Experiment 1 was performed. In Comparative Experiment 1, the backlight device 12 having the configuration described in the paragraph before Comparative Experiment 1 was used as Example 1, and the backlight device having a configuration in which the linear Fresnel lens 19 and the second louver 20 were removed from Example 1 was used as Comparative Example 1. In Comparative Experiment 1, brightness related to emission light was measured in a state where the first LED 13 was turned on in each of the backlight devices according to Comparative Example 1 and Example 1 to calculate a percentage of relative brightness (in units of "%"), a diagram was produced in which a brightness distribution was represented by shading, and a graph related to light distribution (brightness angle distribution) in the X-axis direction was produced. In Comparative Experiment 1, for the graph related to the light distribution in the X-axis direction, brightness related to each emission light from three places (central portion, right end portion, and left end portion) different in the X-axis direction of the backlight device was measured, and three graphs were created in each of Comparative Example 1 and Example 1. Further, in Comparative Experiment 1, a percentage (in units of "%") of a ratio acquired by dividing minimum brightness of the calculated relative brightness by maximum brightness was calculated. The percentage of the calculated ratio indicates that uniformity of the brightness distribution is higher with a greater numerical value, and uniformity of the brightness distribution is lower with a smaller numerical value.

Figure 8:
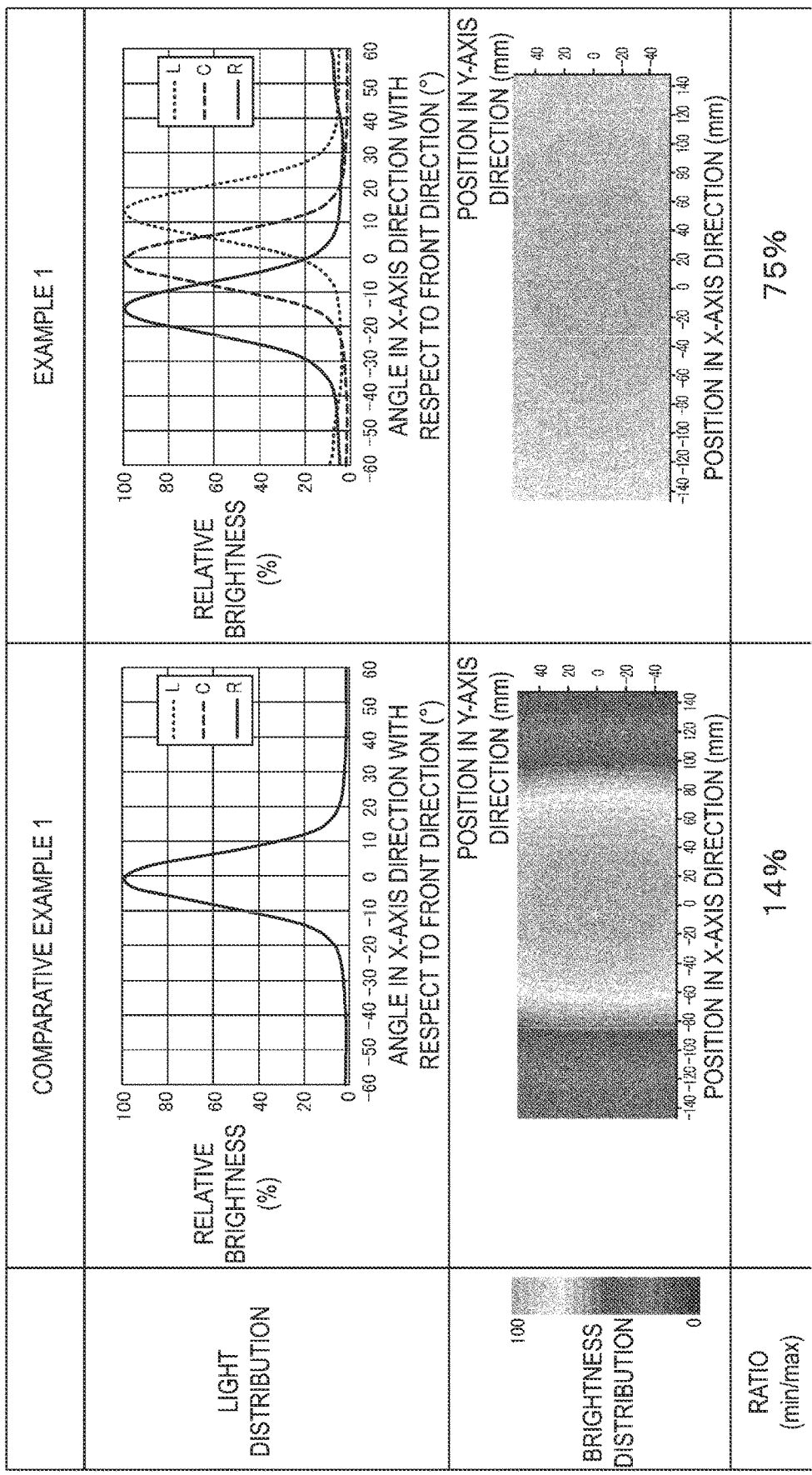
FIG. 8 is a table showing an experimental result of Comparative Experiment 1.

An experimental result of Comparative Experiment 1 is as illustrated in the graph in FIG. 8. FIG. 8 illustrates, in order from the top, a graph related to the light distribution in the X-axis direction in Comparative Example 1 and Example 1, a diagram related to the brightness distribution in Comparative Example 1 and Example 1, and the percentage of the ratio acquired by dividing minimum brightness by maximum brightness in Comparative Example 1 and Example 1. In the graph according to the light distribution illustrated in FIG. 8, a horizontal axis is an angle (in units of "°") in the X-axis direction with respect to the front direction (Z-axis direction), and a vertical axis is relative brightness (in units of "%"). The relative brightness in the vertical axis is a numerical value of a percentage in which maximum brightness is set as a reference (100%). Among the positive and negative symbols provided to the angles in the horizontal axis, "−(negative)" refers to the left side in the X-axis direction with respect to 0° (front direction) as reference when the backlight device is viewed from the front, and "+(positive)" refers to the right side in the X-axis direction with respect to 0° (front direction) as reference when the backlight device is viewed from the front. Further, a legend is illustrated in the graph of the light distribution illustrated in FIG. 8. In the legend, light distribution according to the emission light from the central portion in the X-axis direction when the backlight device is viewed from the front is represented as "C", light distribution according to the emission light from the right end portion in the X-axis direction is represented as "R", and light distribution according to the emission light from the left end portion in the X-axis direction is represented as "L". In the diagram according to the brightness distribution illustrated in FIG. 8, a level of the brightness is represented by shading. The diagram according to the brightness distribution illustrated in FIG. 8 illustrates a position in the X-axis direction (in units of "mm") and a position in the Y-axis direction (in units of "mm"). A reference position (0 mm) of the position in the X-axis direction is a central position in the X-axis direction. Positive and negative symbols indicated in the position in the X-axis direction have the same meaning as the symbols provided to the horizontal axis in the graph. FIG. 8 illustrates, in addition to the diagram according to the brightness distribution, the legend according to shading of the brightness. Further, FIG. 8 illustrates a numerical value (100% and 0%) of the relative brightness corresponding to the legend.

The experimental result of Comparative Experiment 1 will be described. In the graph according to the light distribution in FIG. 8, in Comparative Example 1, the three light distributions of L, C, and R overlap each other, and peak brightness of each of the light distributions is 0°, that is, near the front direction. This means that, when the backlight device in Comparative Example 1 is viewed from the front, the central portion in the X-axis direction has peak brightness, but the right end portion and the left end portion in the X-axis direction have brightness lower than the peak brightness. In practice, when the backlight device is viewed from the front, the central portion in the X-axis direction has an angle of approximately 0°, whereas the right end portion and the left end portion in the X-axis direction have an angle of approximately ±10°. Therefore, in Comparative Example 1, the right end portion and the left end portion in the X-axis direction have relative brightness of approximately 30% to 40%. In the brightness distribution in Comparative Example 1, the above-described light distribution is reflected, and high relative brightness close to 100% is obtained around the central position (0 mm) in the X-axis direction, and low relative brightness of approximately 30% to 40% is obtained around both end positions (150 mm) in the X-axis direction. Further, a ratio acquired by dividing minimum brightness by maximum brightness in Comparative Example 1 is 14% and low.

In contrast, in Example 1, the light distribution of L is shifted to the angle side of "+" with respect to the light distribution of C, and the light distribution of R is shifted to the angle side of "−". The peak brightness of the light distribution of C is around 0°. The peak brightness of the light distribution of L is around +10°. The peak brightness of the light distribution of R is around −15°. This means that, when the backlight device in Example 1 is viewed from the front, all of the central portion, the right end portion, and the left end portion in the X-axis direction have brightness close to the peak brightness. In other words, it can be said that emission light from the right end portion and the left end portion in the X-axis direction of the backlight device is angled so as to be directed and travel toward the central side in the X-axis direction. Further, the relative brightness is sufficiently suppressed to low at an angle equal to or greater than 45° with an absolute value. In the brightness distribution in Example 1, the above-described light distribution is reflected, and high relative brightness close to 100% is obtained around the central position (0 mm) in the X-axis direction, and high relative brightness of approximately 70% to 80% is also obtained around both end positions (150 mm) in the X-axis direction. Further, a ratio acquired by dividing minimum brightness by maximum brightness in Example 1 is 75% and is significantly higher than that in Comparative Example 1. From these experimental results, it can be said that the brightness distribution is made uniform by the linear Fresnel lens sheet 19 provided in the backlight device 12 in Example 1, and an occurrence of side lobe light at an angle equal to or greater than 45° with an absolute value is suppressed by the second louver 20.

Next, Demonstration Experiment 1 was performed in order to acquire knowledge related to how light distribution changes when the inclination angle θ2 formed by the second inclined surface 19C2 of the first lens 19C of the linear Fresnel lens sheet 19 with respect to the X-axis direction is changed. In Demonstration Experiment 1, the backlight device 12 having the same configuration as that described before the present paragraph is used except for a configuration of the first lens 19C. In Demonstration Experiment 1, while the inclination angle θ1 formed by the first inclined surface 19C1 of the first lens 19C with respect to the X-axis direction is fixed to 15°, the inclination angle θ2 formed by the second inclined surface 19C2 with respect to the X-axis direction is changed in a range from 40° to 80°. The reason for fixing the inclination angle θ1 to 15° is that the peak brightness of the emission light is set to be approximately 10° to reproduce the light distribution of L among the three light distributions according to Example 1 in Comparative Experiment 1 described above (see FIG. 8). In other words, it can be said that the inclination angle θ2 indicated in Demonstration Experiment 1 is the inclination angle θ2 of the second inclined surface 19C2 in the first lens 19C located near the left end portion of the linear Fresnel lens sheet 19 among the plurality of first lenses 19C aligned along the X-axis direction. Specifically, in Demonstration Experiment 1, the inclination angle θ2 was set to 40°, 44°, 45°, 46°, 47°, 48°, 49°, 50°, 53°, 55°, 56°, 57°, 58°, 59°, 60°, 61°, 63°, 64°, 65°, 66°, 67°, 68°, 69°, 70°, 71°, 72°, 75°, 78°, and 80°. In the backlight device 12 in which the inclination angle θ2 was changed in such a manner, brightness according to emission light in a state where the first LED 13 was turned on was measured, and a graph according to light distribution (brightness angle distribution) in the X-axis direction was produced. Moreover, ratios of light in an angle range from −20° to −45° of the light distribution in the X-axis direction at all the inclination angle θ2 described above were each calculated. In the calculation, a numerical value of peak brightness in the angle range from −20° to −45° is divided by overall peak brightness (relative brightness "1").

Figure 9:
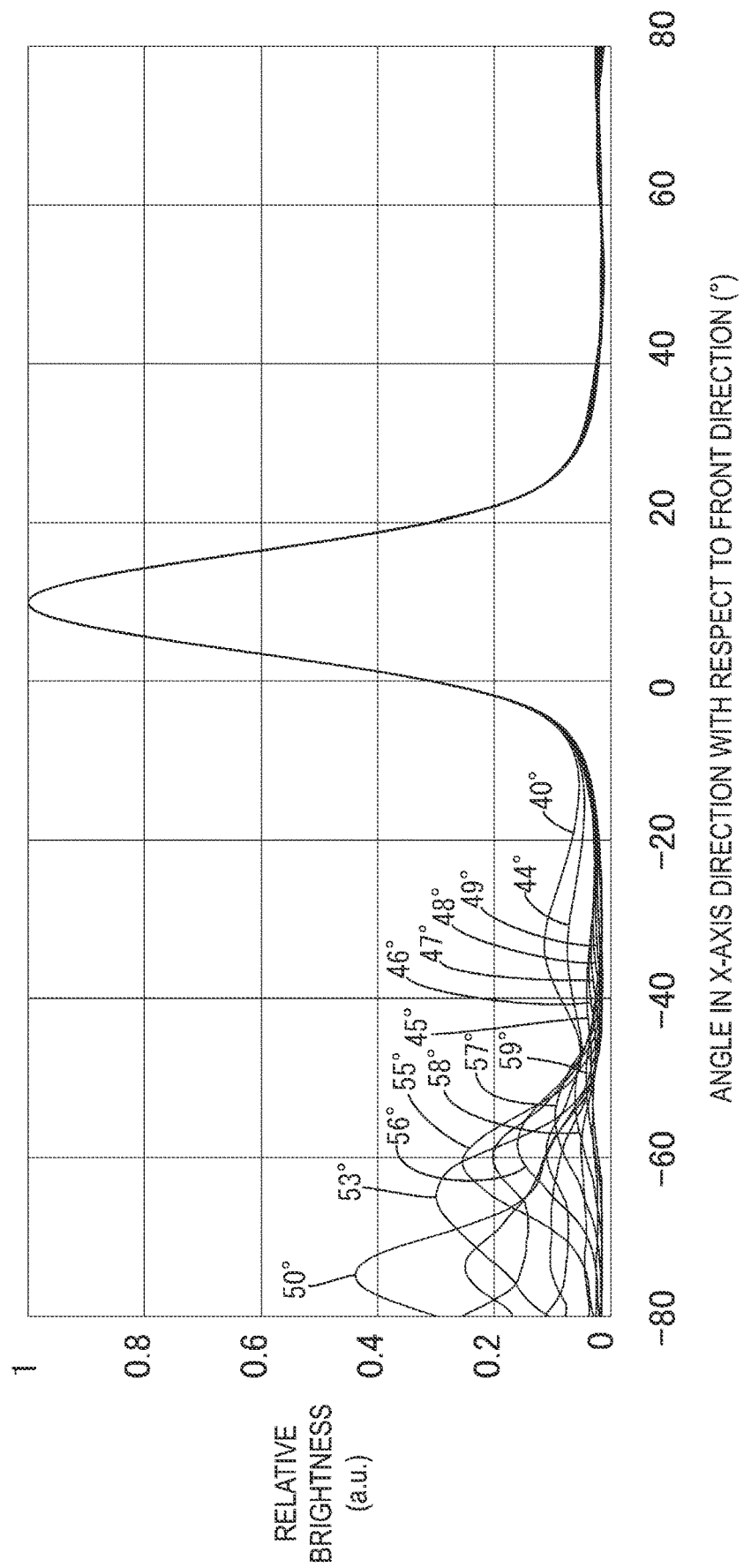
FIG. 9 is a graph showing an experimental result of the inclination angle $\theta 2$ in Demonstration Experiment 1 at 40° to 59°
Figure 10:
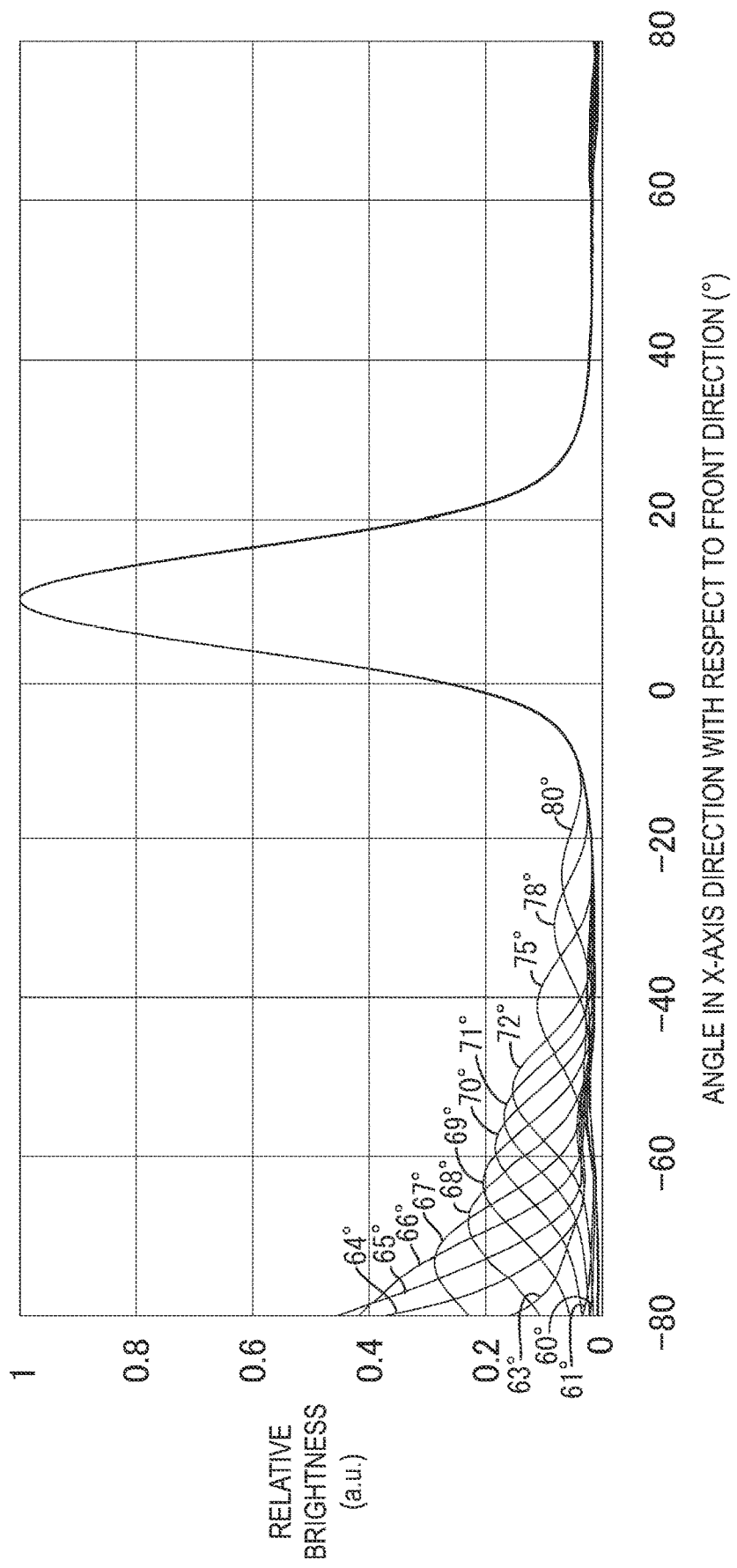
FIG. 10 is a graph showing an experimental result of the inclination angle $\theta 2$ in Demonstration Experiment 1 at 60° to 80°
Figure 11:
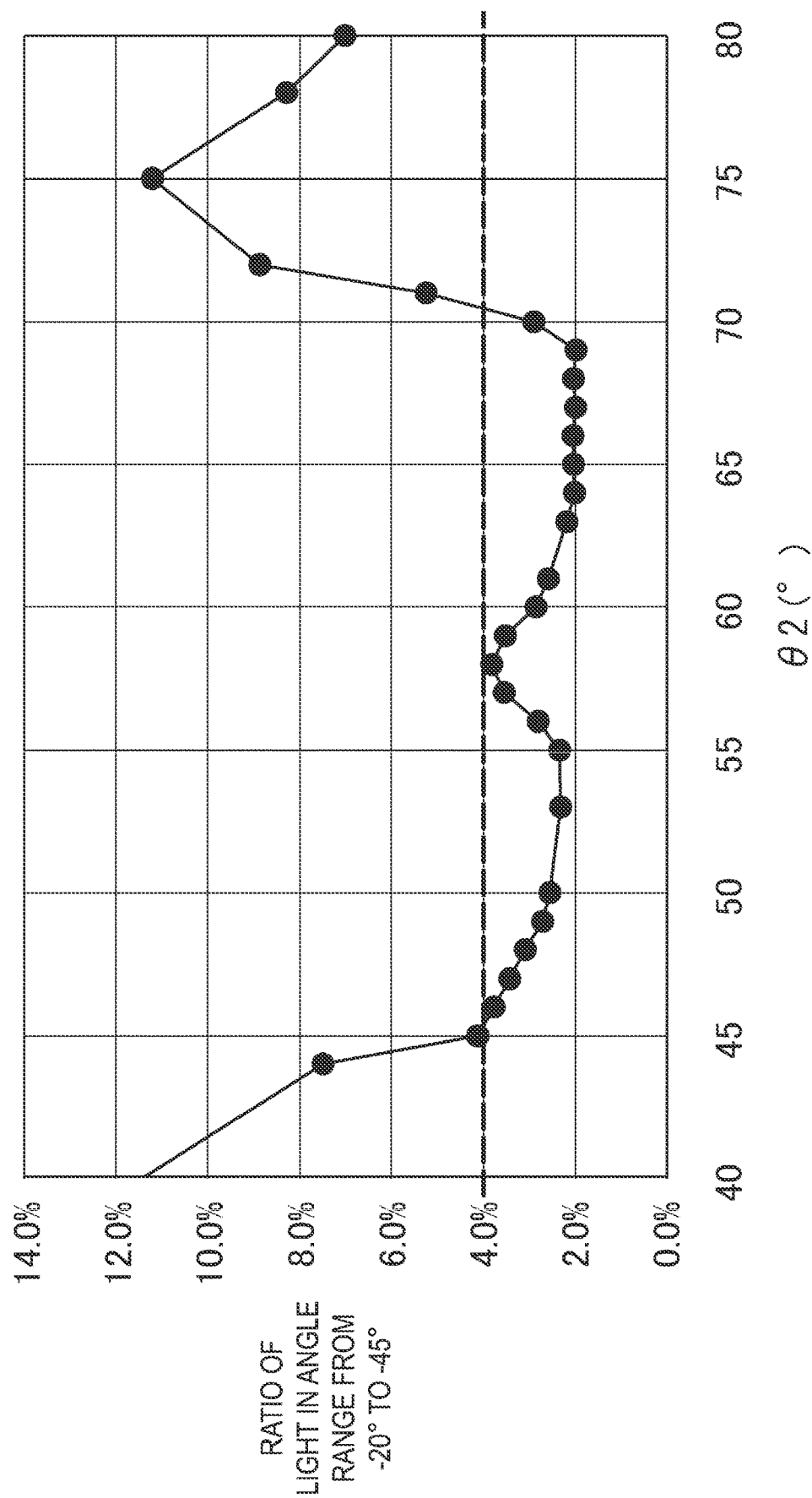
FIG. 11 is a graph showing a relationship between a ratio of light in an angle range from −20° to −45° in Demonstration Experiment 1 and the inclination angle $\theta 2$.
Figure 12:
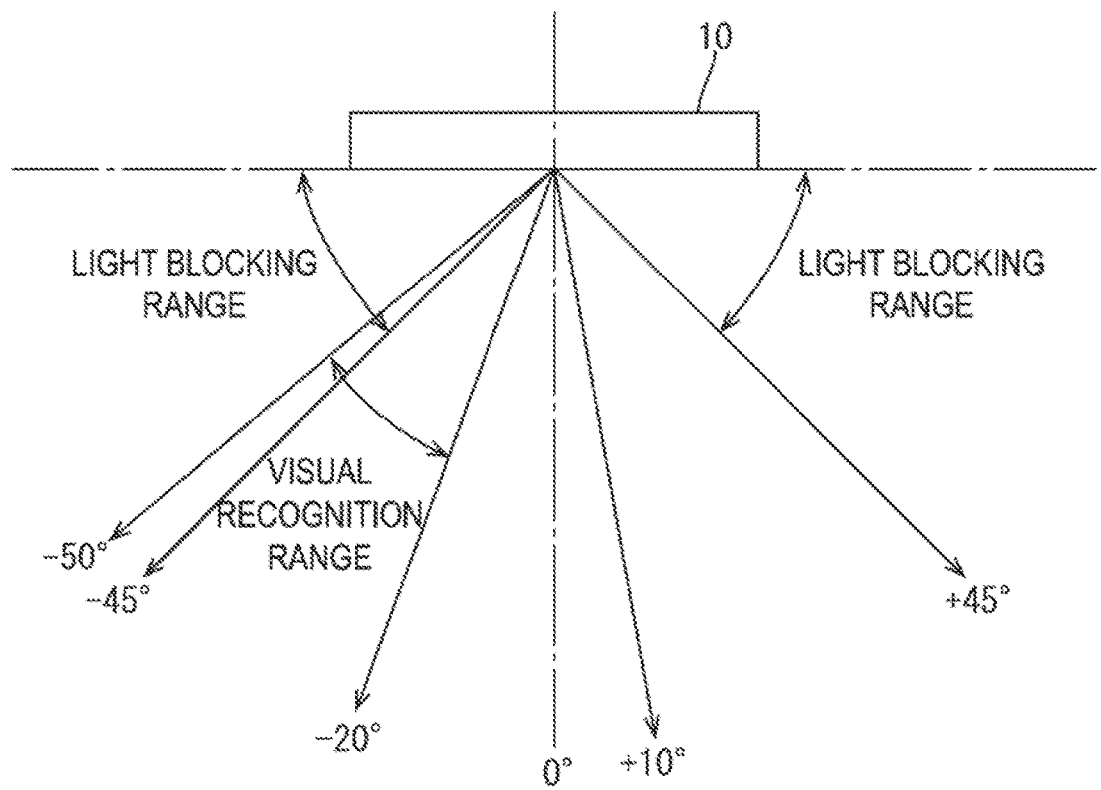
FIG. 12 is a diagram for describing an angle in the X-axis direction with respect to a front direction in the liquid crystal display device installed in front of a passenger seat of a passenger vehicle.

An experimental result according to the light distribution in Demonstration Experiment 1 is as shown in FIGS. 9 and 10. FIG. 9 shows an experimental result of the inclination angle θ2 at 40° to 59°. FIG. 10 shows an experimental result of the inclination angle θ2 at 60° to 80°. In the graph according to the light distribution shown in FIGS. 9 and 10, a horizontal axis is an angle (in units of "°") in the X-axis direction with respect to the front direction (Z-axis direction), and a vertical axis is relative brightness (no unit). The relative brightness in the vertical axis is an absolute value in which maximum brightness is set as a reference (1). Positive and negative symbols provided to the angles in the horizontal axis have the same meaning as the symbols provided to the horizontal axis in the graph in FIG. 8. In FIGS. 9 and 10, a numerical value of the inclination angle θ2 corresponding to each graph is indicated. An experimental result according to the ratios of the light in the angle range from −20° to −45° in Demonstration Experiment 1 is as shown in FIG. 11. In the graph according to the ratios of the light in the angle range from −20° to −45° shown in FIG. 11, a horizontal axis is the inclination angle θ2 (in units of "°"), and a vertical axis is a percentage (in units of "%") of the ratios of the light in the angle range from −20° to −45°. FIG. 12 is illustrated for a supplementary description of the graphs shown in FIGS. 9 to 11. FIG. 12 is a diagram for describing an angle in the X-axis direction with respect to the front direction in the liquid crystal display device 10 installed in front of a passenger seat of a passenger vehicle. FIG. 12 illustrates an angle)(+10° at which emission light from the backlight device 12 in Demonstration Experiment 1 has peak brightness, a light blocking range (+45° to +90°, −45° to)−90° in which light is blocked by the second louver 20, and a visual recognition range (−20° to)−50° when the liquid crystal display device 10 is visually recognized from a driver seat located on the left side to the passenger seat.

The experimental result of Demonstration Experiment 1 will be described. According to FIG. 9, in a range from 40° to 50°, an absolute value of an angle at which side lobe light occurs tends to increase with a greater numerical value of the inclination angle θ2. Specifically, peak brightness of side lobe light is around −35° when the inclination angle θ2 is 40°, whereas peak brightness of side lobe light is around −75° when the inclination angle θ2 is 50°. In a range from 50° to 59°, an absolute value of an angle at which side lobe light occurs tends to decrease with a greater numerical value of the inclination angle θ2. Specifically, peak brightness of side lobe light is around −65° when the inclination angle θ2 is 53°, whereas peak brightness of side lobe light is around −50° when the inclination angle θ2 is 59°.

According to FIG. 10, in a range from 60° to 66°, an absolute value of an angle at which side lobe light occurs tends to increase with a greater numerical value of the inclination angle θ2. Specifically, peak brightness of side lobe light is around −55° when the inclination angle θ2 is 60°, whereas peak brightness of side lobe light is around −80° when the inclination angle θ2 is 65°. In a range from 66° to 80°, an absolute value of an angle at which side lobe light occurs tends to decrease with a greater numerical value of the inclination angle θ2. Specifically, peak brightness of side lobe light is around −80° when the inclination angle θ2 is 66°, whereas peak brightness of side lobe light is around −25° when the inclination angle θ2 is 80°.

According to FIG. 11, it is clear that the ratios of light in the angle range from −20° to −45° are both sharply high at the inclination angle θ2 equal to less than 45° and equal to or greater than 71°. On the other hand, in a range of the inclination angle θ2 from 46° to 70°, the ratios of the light in the angle range from −20° to −45° can be kept low at equal to or less than 4%. Here, according to FIG. 12, the light blocking range by the second louver 20 is an angle range from +45° to +90° and an angle range from −45° to −90°, and side lobe light present in these angle ranges is not visually recognized from the driver seat. Therefore, light in an angle range from −20° to −45° is side lobe light that may be visually recognized from the driver seat on the left side of the passenger seat. From this, when a ratio of light in the angle range from −20° to −45° can be low, specifically, equal to or less than 4%, a display image of the liquid crystal display device 10 can be hardly visually recognized from the driver seat. According to the experimental result in FIG. 11, with the inclination angle θ2 in the range from 46° to 70°, a ratio of light in the angle range from −20° to −45° can be equal to or less than 4%, and the visual recognition of the display image from the driver seat can be prevented in an excellent manner. Here, since the apex angle θ3 of the first lens 19C is fixed at 110°, it can be said that a ratio of light in the angle range from −20° to −45° can be equal to or less than 4% when the inclination angle θ1 formed by the first inclined surface 19C1 with respect to the X-axis direction is in the range from 0° to 24°. Note that, with a numerical value of the inclination angle θ2 below 40°, a lot of light incident on the first lens 19C is refracted by the second inclined surface 19C2 to become side lobe light, and thus it is inferred that the side lobe light becomes excessive, and the light in the angle range from −20° to −45° also significantly increases.

As described above, the backlight device (illumination device) 12 according to the present embodiment includes: the first louver (first sheet) 18 including the first light entering main surface 18A being one main surface along a first direction, the first light emission main surface 18B being an other main surface along the first direction, the two first light blocking portions 18C disposed at an interval in the first direction, and the first light-transmitting portion 18D disposed between the two first light blocking portions 18C; the linear Fresnel lens sheet (second sheet) 19 including the second light entering main surface 19A being one main surface disposed along the first direction and configured to face the first light emission main surface 18B, the second light emission main surface 19B being an other main surface along the first direction, and the first lens 19C disposed on the second light entering main surface 19A or the second light emission main surface 19B; and the second louver (third sheet) 20 including the third light entering main surface 20A being one main surface disposed along the first direction and configured to face the second light emission main surface 19B, the third light emission main surface 20B being an other main surface along the first direction, the two second light blocking portions 20C disposed at an interval in the first direction, and the second light-transmitting portion 20D disposed between the two second light blocking portions 20C, wherein the first lens 19C includes the first inclined surface 19C1 having an inclination rising from the end side in the first direction in the linear Fresnel lens sheet 19 toward the central side, and the second louver 20 has a ratio acquired by dividing the width W2 of the second light-transmitting portion 20D by the height H2 greater than a ratio acquired by dividing the width W1 of the first light-transmitting portion 18D by the height H1.

The light incident on the first light entering main surface 18A of the first louver 18 is transmitted through the first light-transmitting portion 18D disposed between the two first light blocking portions 18C, and is emitted from the first light emission main surface 18B. An emission angle of the emission light from the first light emission main surface 18B is restricted by the two first light blocking portions 18C. When light emitted from the first light emission main surface 18B is incident on the second light entering main surface 19A of the linear Fresnel lens sheet 19, the light is refracted by the first inclined surface 19C1 of the first lens 19C and emitted from the second light emission main surface 19B. Since the first inclined surface 19C1 has the inclination rising from the end side in the first direction in the linear Fresnel lens sheet 19 toward the central side, the anisotropy refraction action of directing toward the central side in the first direction is provided to the emission light from the second light emission main surface 19B. When the light emitted from the second light emission main surface 19B is incident on the third light entering main surface 20A of the second louver 20, the light is transmitted through the second light-transmitting portion 20D disposed between the two second light blocking portions 20C and is emitted from the third light emission main surface 20B. An emission angle of the emission light from the third light emission main surface 20B is restricted by the two second light blocking portions 20C.

Here, the first louver 18 has a ratio acquired by dividing the width W1 of the first light-transmitting portion 18D by the height H1 smaller than a ratio acquired by dividing the width W2 of the second light-transmitting portion 20D by the height H2. According to this configuration, a maximum absolute value of an angle formed by light transmitted through the first light-transmitting portion 18D with respect to the normal direction of the first light emission main surface 18B is smaller than a maximum absolute value of an angle formed by light transmitted through the second light-transmitting portion 20D with respect to the normal direction of the third light emission main surface 20B. In this way, the light emitted from the first light emission main surface 18B and incident on the second light entering main surface 19A of the linear Fresnel lens sheet 19 includes a lot of light close to the normal direction of the first light emission main surface 18B. Therefore, the light refracted by the first inclined surface 19C1 of the first lens 19C provided in the linear Fresnel lens sheet 19 is effectively provided with directivity toward the central side in the first direction.

On the other hand, the second louver 20 has a ratio acquired by dividing the width W2 of the second light-transmitting portion 20D by the height H2 greater than a ratio acquired by dividing the width W1 of the first light-transmitting portion 18D by the height H1. According to this configuration, a maximum absolute value of an angle formed by light transmitted through the second light-transmitting portion 20D with respect to the normal direction of the third light emission main surface 20B is greater than a maximum absolute value of an angle formed by light transmitted through the first light-transmitting portion 18D with respect to the normal direction of the first light emission main surface 18B. In this way, a situation where light provided with the anisotropy refraction action by the linear Fresnel lens sheet 19 has an emission angle excessively restricted by the second louver 20 can be avoided. Thus, since the anisotropy refraction action provided by the linear Fresnel lens sheet 19 is sufficiently reflected in the emission light from the third light emission main surface 20B, brightness of the emission light is made uniform between the central side portion and both end side portions of the third light emission main surface 20B in the first direction. Further, since an emission angle of the emission light from the third light emission main surface 20B is restricted by the two second light blocking portions 20C, side lobe light that may occur in emission light of the backlight device 12 can be reduced.

Further, the plurality of first lenses 19C are disposed side by side in the first direction, the plurality of first lenses 19C include the central side lens 19CC, and the end side lens 19CE located closer to the end side in the first direction in the linear Fresnel lens sheet 19 than the central side lens 19CC, and the angle θ1E formed by the first inclined surface 19C1 of the end side lens 19CE with respect to the first direction is greater than the angle θ1C formed by the first inclined surface 19C1 of the central side lens 19CC with respect to the first direction. The anisotropy refraction action provided to light by the first inclined surface 19C1 of the end side lens 19CE located closer to the end side in the first direction in the linear Fresnel lens sheet 19 than the central side lens 19CC is stronger than the anisotropy refraction action provided to light by the first inclined surface 19C1 of the central side lens 19CC located closer to the central side in the first direction than the end side lens 19CE. In other words, in the second light emission main surface 19B of the linear Fresnel lens sheet 19, emission light from an end side portion in the first direction has stronger directivity toward the central side in the first direction than emission light from a central side portion in the first direction. Since an emission angle of emission light excessively restricted is avoided in the second louver 20 on which emission light from the second light emission main surface 19B is incident, brightness of the emission light is made uniform between a central side portion and both end side portions of the third light emission main surface 20B of the second louver 20 in the first direction.

Further, the plurality of first lenses 19C each include the second inclined surface 19C2 having an inclination rising from the central side in the first direction in the linear Fresnel lens sheet 19 toward the end side. As compared to when the second inclined surface 19C2 is a vertical surface perpendicular to the first direction, processing of the plurality of first lenses 19C in manufacturing the linear Fresnel lens sheet 19 is facilitated. On the other hand, the light provided with the refraction effect by the second inclined surface 19C2 may be directed toward the end side in the first direction, and may become side lobe light. In this regard, since an emission angle of emission light from the third light emission main surface 20B is restricted by the two second light blocking portions 20C provided in the second louver 20, the side lobe light caused by the second inclined surface 19C2 can be sufficiently reduced.

Further, the apex angle θ3C being an angle formed between the first inclined surface 19C1 and the second inclined surface 19C2 of the central side lens 19CC is equal to the apex angle θ3E of the end side lens 19CE, and the angle θ2E formed by the second inclined surface 19C2 of the end side lens 19CE with respect to the first direction is smaller than the angle θ2C formed by the second inclined surface 19C2 of the central side lens 19CC with respect to the first direction. In this way, since the apex angle θ3C of the central side lens 19CC is equal to the apex angle θ3E of the end side lens 19CE, processing of a mold used for molding is facilitated when the linear Fresnel lens sheet 19 is manufactured by resin molding, for example. By making the apex angles θ3 of the central side lens 19CC and the end side lens 19CE equal, the angle θ2E formed by the second inclined surface 19C2 of the end side lens 19CE with respect to the first direction is smaller than the angle θ2C of the second inclined surface 19C2 of the central side lens 19CC with respect to the first direction. Thus, side lobe light caused by the second inclined surface 19C2 of the end side lens 19CE tends to be greater than side lobe light caused by the second inclined surface 19C2 of the central side lens 19CC. In contrast, since an emission angle of emission light from the third light emission main surface 20B is restricted by the two second light blocking portions 20C provided in the second louver 20, the side lobe light caused by the second inclined surface 19C2 of the end side lens 19CE can be sufficiently reduced.

Further, the plurality of first lenses 19C have the angle θ1 formed by the first inclined surface 19C1 with respect to the first direction in a range from 0° to 24°, and have the angle θ2 formed by the second inclined surface 19C2 with respect to the first direction in a range from 46° to 70°. When the angle θ1 formed by the first inclined surface 19C1 with respect to the first direction is greater than 24° and the angle θ2 formed by the second inclined surface 19C2 with respect to the first direction is smaller than 46°, side lobe light that is difficult to block in the second light blocking portion 20C of the second louver 20 becomes excessive. When the angle θ1 formed by the first inclined surface 19C1 with respect to the first direction is smaller than 0° and the angle θ2 formed by the second inclined surface 19C2 with respect to the first direction is greater than 70°, side lobe light that is difficult to block in the second light blocking portion 20C of the second louver 20 also becomes excessive. In this regard, as described above, in the plurality of first lenses 19C, when the angle θ1 formed by the first inclined surface 19C1 with respect to the first direction is in a range from 0° to 24° and the angle θ2 formed by the second inclined surface 19C2 with respect to the first direction is in a range from 46° to 70°, side lobe light that is difficult to block in the second light blocking portion 20C of the second louver 20 can be sufficiently suppressed.

Further, the backlight device 12 includes: the first LED (first light source) 13; the first light guide plate 14 aligned along the first direction with respect to the first LED 13; the first prism sheet 16 disposed on a light emission side with respect to the first light guide plate 14, the first prism sheet 16 including the plurality of first prisms 16B disposed side by side along the first direction and configured to extend along a second direction orthogonal to both of the first direction and the normal direction of the main surface of the first light guide plate 14; and the second prism sheet 17 disposed on the light emission side with respect to the first prism sheet 16, the second prism sheet 17 including the plurality of second prisms 17B disposed side by side along the first direction and configured to extend along the second direction, wherein the first light guide plate 14 includes at least a part of an outer circumferential end face as the first light entering end face 14A facing the first LED 13, and includes one main surface as the first light guide plate-light emission main surface (fourth light emission main surface) 14B configured to emit light, the second prism sheet 17 includes a main surface on the light emission side facing the first light entering main surface 18A of the first louver 18, the first prism 16B includes the first prism inclined surface (third inclined surface) 16B1 having an inclination rising from the first LED 13 side in the first direction in the first prism sheet 16 toward a side opposite to the first LED 13, and includes the second prism inclined surface (fourth inclined surface) 16B2 having an inclination rising from the side opposite to the first LED 13 in the first direction in the first prism sheet 16 toward the first LED 13 side, the second prism 17B includes the third prism inclined surface (fifth inclined surface) 17B1 having an inclination rising from the first LED 13 side in the first direction in the second prism sheet 17 toward the side opposite to the first LED 13, and includes the fourth prism inclined surface (sixth surface) 17B2 having an inclination rising from the side opposite to the first LED 13 in the first direction in the second prism sheet 17 toward the first LED 13 side, and the angle θ7 formed by the third prism inclined surface 17B1 in the second prism 17B with respect to the first direction is smaller than the angle θ4 formed by the first prism inclined surface 16B1 in the first prism 16B with respect to the first direction.

Light emitted from the first LED 13 and incident on the first light entering end face 14A of the first light guide plate 14 propagates inside the first light guide plate 14, and is also emitted from the first light guide plate-light emission main surface 14B and incident on the first prism sheet 16. Most of the light incident on the first prism sheet 16 is incident on the second prism inclined surface 16B2 of the first prism 16B and refracted, and then, is raised and emitted, or is directed to the first prism inclined surface 16B1. Here, the first prism 16B has the angle θ4 formed by the first prism inclined surface 16B1 with respect to the first direction greater than the angle θ7 formed by the third prism inclined surface 17B1 of the second prism 17B with respect to the first direction. Thus, as compared to when the angles are the same or a magnitude relationship between the angles is reversed, light incident on the first prism sheet 16 is less likely and incident on the first prism inclined surface 16B1 in the first prism 16B. When the incident light on the first prism sheet 16 is incident on the first prism inclined surface 16B1 of the first prism 16B, the light tends to be more likely to be emitted as side lobe light when the light is emitted from the first prism 16B. Therefore, when the incident light on the first prism sheet 16 becomes difficult to be directly incident on the first prism inclined surface 16B1 of the first prism 16B, an occurrence of side lobe light is suppressed, and, as a result, usage efficiency of light is improved.

Most of the light emitted from the first prism sheet 16 and incident on the second prism sheet 17 is incident on the fourth prism inclined surface 17B2 of the second prism 17B and refracted, and then, is raised and emitted, or is directed to the third prism inclined surface 17B1. Here, the second prism 17B has the angle θ7 formed by the third prism inclined surface 17B1 with respect to the first direction smaller than the angle θ4 formed by the first prism inclined surface 16B1 of the first prism 16B with respect to the first direction. Thus, as compared to when the angles are the same or a magnitude relationship between the angles is reversed, light refracted by the sixth inclined surface and directed to the third prism inclined surface 17B1 is more likely to be returned to the first prism sheet 16 side by the third prism inclined surface 17B1. As a result, the amount of the light (hereinafter referred to as recursive light) returned from the second prism sheet 17 to the first prism sheet 16 side is increased. This recursive light reaches the second prism sheet 17 again by being reflected or the like inside the backlight device 12, and is raised and emitted by the third prism inclined surface 17B1 or the fourth prism inclined surface 17B2 of the second prism 17B, and thus usage efficiency of light is improved. Further, since an optical path until the recursive light is emitted from the second prism sheet 17 is complicated, a rise angle provided by the second prism 17B is also diversified, thereby improving viewing angle characteristics.

The light emitted from the second prism sheet 17 is incident on the first light entering main surface 18A of the first louver 18. The light incident on the first light entering main surface 18A has less side lobe light and also has higher usage efficiency by the recursive light, and thus the amount of transmitted light of the first light-transmitting portion 18D is sufficiently ensured, and the amount of light blocked by the first light blocking portion 18C also decreases. In this way, it is suitable to improve brightness according to emission light of the backlight device 12, and the like.

Further, the liquid crystal display device (display device) 10 according to the present embodiment includes the backlight device 12 described above, and the liquid crystal panel (display panel) 11 configured to perform display by using light from the backlight device 12. According to the liquid crystal display device 10 having such a configuration, a brightness distribution according to emission light from the backlight device 12 is made uniform, and thus, display can be achieved with excellent display quality.

Second Embodiment

A second embodiment will be described with reference to FIG. 13. In the second embodiment, a linear Fresnel lens sheet 119 with a modified arrangement will be indicated. Further, repetitive descriptions of structures, actions, and effects similar to those of the first embodiment described above will be omitted.

Figure 13:
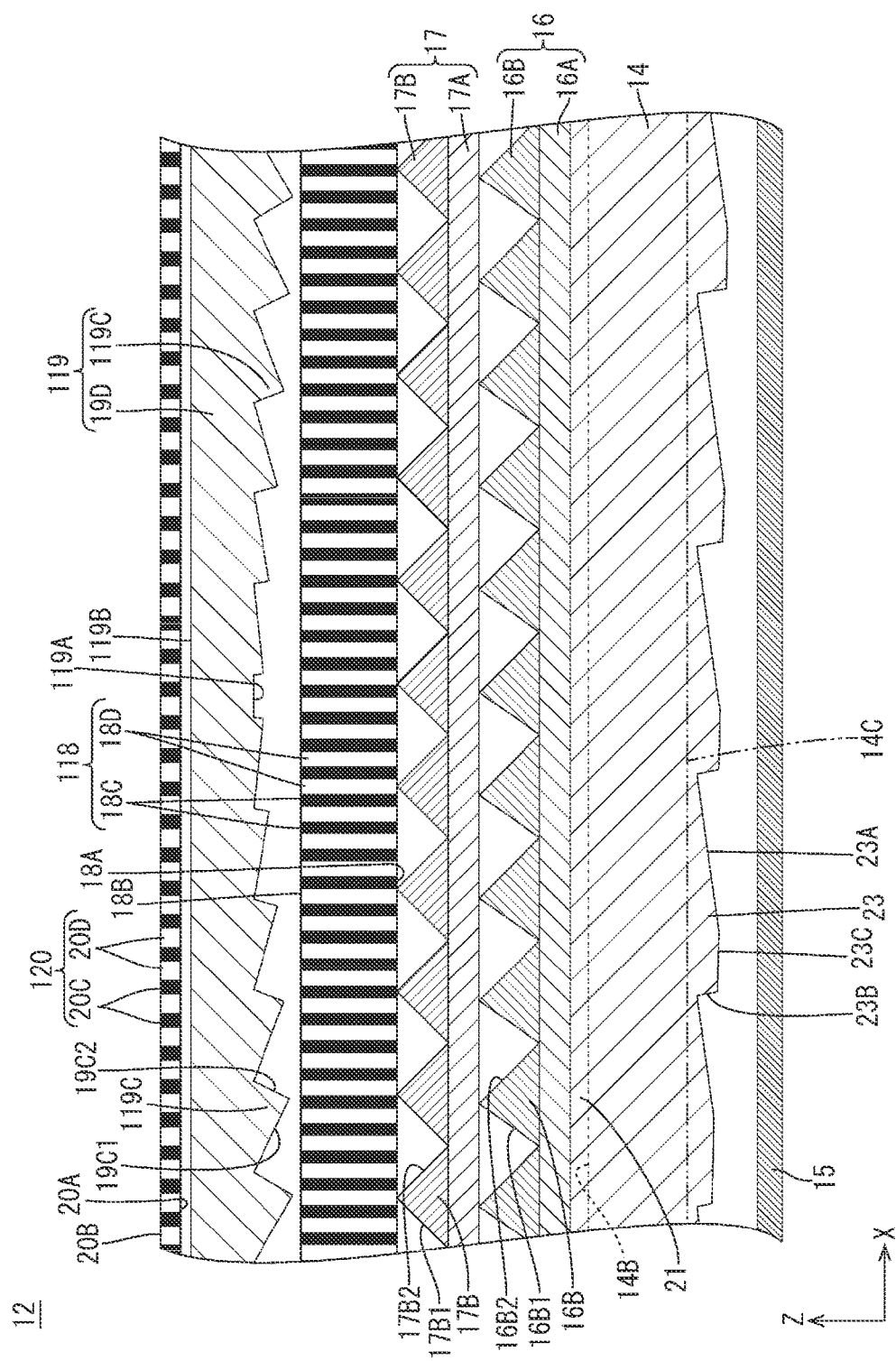
FIG. 13 is a side cross-sectional view of a backlight device according to a second embodiment.

As illustrated in FIG. 13, the linear Fresnel lens sheet 119 according to the present embodiment is disposed in a posture such that a first lens 119C faces the back side, that is, a first louver 118 side. In other words, the first lens 119C is provided on a second light entering main surface 119A of the linear Fresnel lens sheet 119. Of the linear Fresnel lens sheets 119, a second light emission main surface 119B in which the first lens 119C is not formed faces a second louver 120. Even with such a configuration, actions and effects similar to those in the above-described first embodiment can be obtained.

Third Embodiment

A third embodiment will be described with reference to FIG. 14. In the third embodiment, a case where a linear Fresnel lens sheet 219 is changed from the second embodiment described above will be indicated. Further, repetitive descriptions of structures, actions, and effects similar to those of the second embodiment described above will be omitted.

Figure 14:
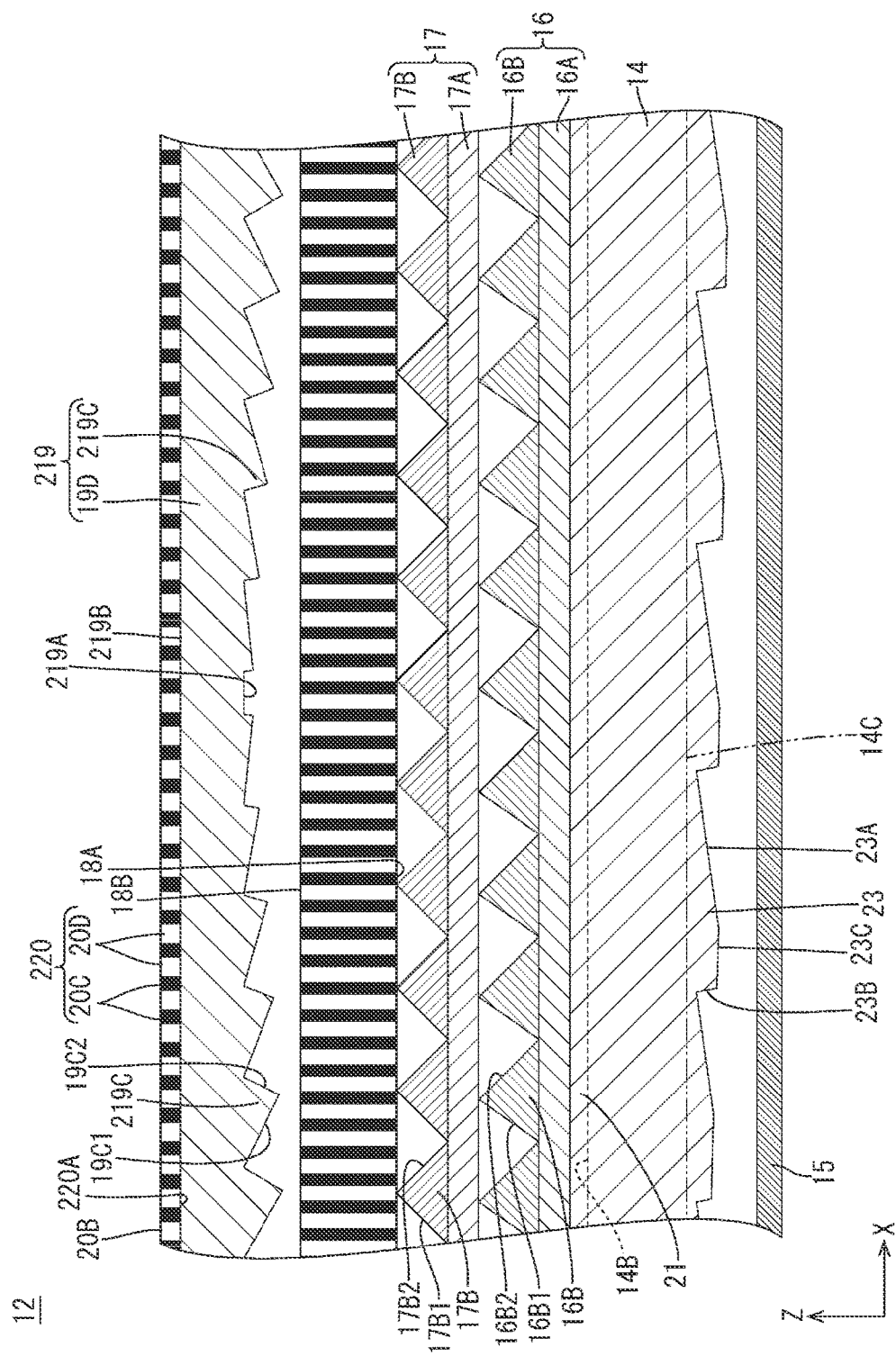
FIG. 14 is a side cross-sectional view of a backlight device according to a third embodiment.

As illustrated in FIG. 14, in the linear Fresnel lens sheet 219 according to the present embodiment, a second light emission main surface 219B is attached to a third light entering main surface 220A of a second louver 220. For the attachment, for example, an adhesive may be interposed between the third light entering main surface 220A of the second louver 220 and the second light emission main surface 219B of the linear Fresnel lens sheet 219. In this way, the third light entering main surface 220A of the second louver 220 and the second light emission main surface 219B of the linear Fresnel lens sheet 219 are kept in a close adhesion state throughout the entire area, and partial presence of an air layer (non-adhesive portion) therebetween can be avoided. In this way, a situation where light incident on the third light entering main surface 220A of the second louver 220 is refracted due to the air layer described above can be avoided, and thus unevenness is less likely to be visually recognized. Further, a gap generated between the third light entering main surface 220A of the second louver 220 and the second light emission main surface 219B of the linear Fresnel lens sheet 219 can be avoided, which is also suitable for reducing overall thickness.

As described above, according to the present embodiment, the first lens 219C is disposed on the second light entering main surface 219A, and the second light emission main surface 219B of the linear Fresnel lens sheet 219 is attached to the third light entering main surface 220A of the second louver 220. In a case where the linear Fresnel lens sheet 219 is not attached to the second louver 220, when the second light emission main surface 219B and the third light entering main surface 220A facing each other are partially in close adhesion, there is a risk that a difference in traveling direction of light occurs between an adhesive portion and a non-adhesive portion, which may be visually recognized as unevenness. In this regard, of the linear Fresnel lens sheet 219, the second light emission main surface 219B in which the first lens 219C is not disposed is attached to the third light entering main surface 220A of the second louver 220, and thus the unevenness as described above is avoided. Further, it is also suitable for a thickness reduction.

Fourth Embodiment

A fourth embodiment will be described with reference to FIG. 15. In the fourth embodiment, a case where a linear Fresnel lens sheet 319 is changed from the first embodiment described above will be indicated. Further, repetitive descriptions of structures, actions, and effects similar to those of the first embodiment described above will be omitted.

Figure 15:
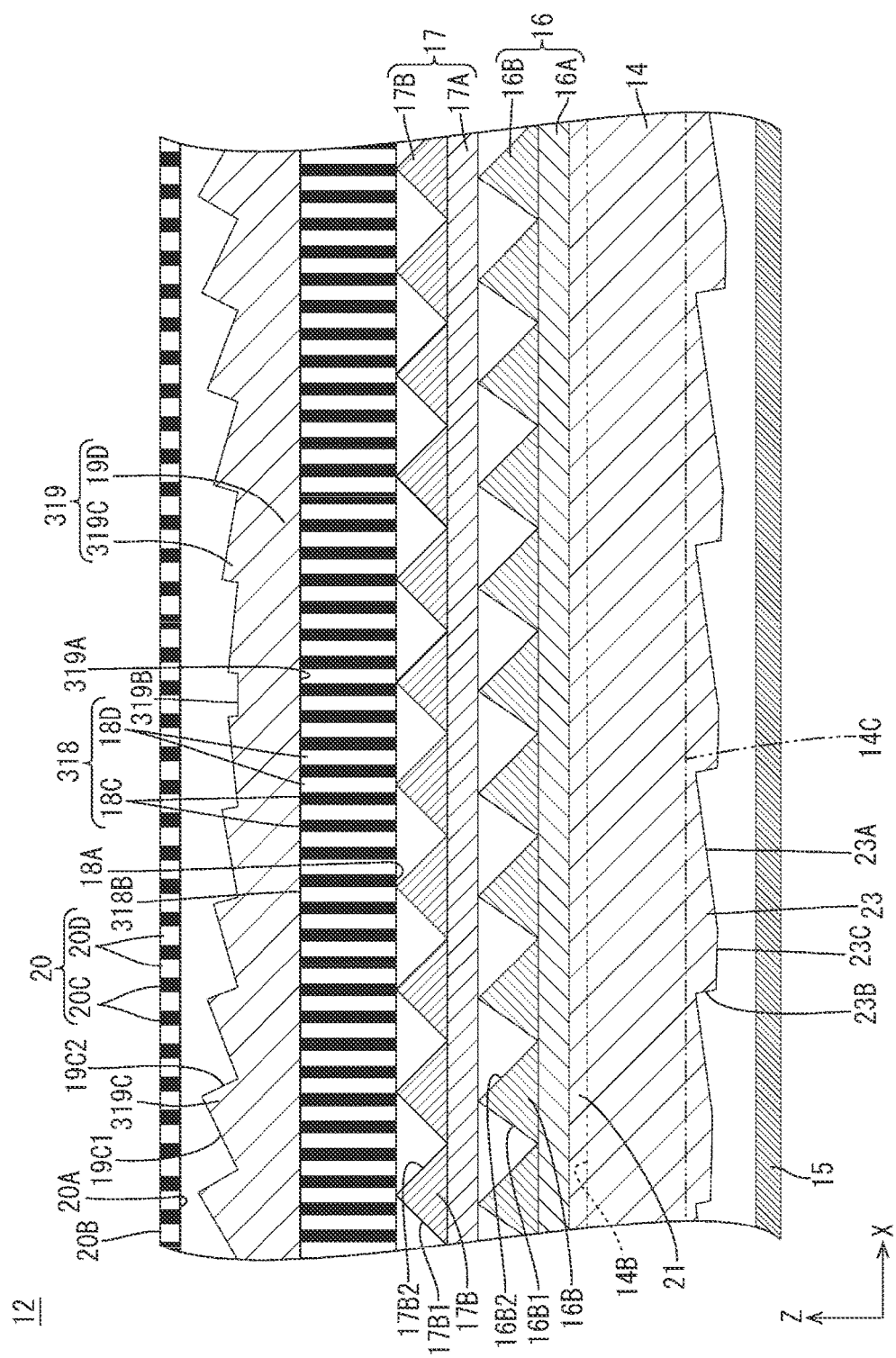
FIG. 15 is a side cross-sectional view of a backlight device according to a fourth embodiment.

As illustrated in FIG. 15, in the linear Fresnel lens sheet 319 according to the present embodiment, a second light entering main surface 319A is attached to a first light emission main surface 318B of a first louver 318. For the attachment, for example, an adhesive may be interposed between the first light emission main surface 318B of the first louver 318 and the second light entering main surface 319A of the linear Fresnel lens sheet 319. In this way, the first light emission main surface 318B of the first louver 318 and the second light entering main surface 319A of the linear Fresnel lens sheet 319 are kept in a close adhesion state throughout the entire area, and partial presence of an air layer (non-adhesive portion) therebetween can be avoided. In this way, a situation where light incident on the first light emission main surface 318B of the first louver 318 is refracted due to the air layer described above can be avoided, and thus unevenness is less likely to be visually recognized. Further, a gap generated between the first light emission main surface 318B of the first louver 318 and the second light entering main surface 319A of the linear Fresnel lens sheet 319 can be avoided, which is also suitable for reducing overall thickness.

As described above, according to the present embodiment, the first lens 319C is disposed on the second light emission main surface 319B, and the second light entering main surface 319A is attached to the first light emission main surface 318B of the first louver 318 in the linear Fresnel lens sheet 319. In a case where the linear Fresnel lens sheet 319 is not attached to the first louver 318, when the second light entering main surface 319A and the first light emission main surface 318B facing each other are partially in close adhesion, there is a risk that a difference in traveling direction of light occurs between an adhesive portion and a non-adhesive portion, which may be visually recognized as unevenness. In this regard, of the linear Fresnel lens sheet 319, the second light entering main surface 319A in which the first lens 319C is not disposed is attached to the first light emission main surface 318B of the first louver 318, and thus the unevenness as described above is avoided. Further, it is also suitable for a thickness reduction.

Fifth Embodiment

A fifth embodiment will be described with reference to FIG. 16. In the fifth embodiment, a backlight device 412 with a modified configuration from that in the first embodiment described above will be indicated. Further, repetitive descriptions of structures, actions, and effects similar to those of the first embodiment described above will be omitted.

Figure 16:
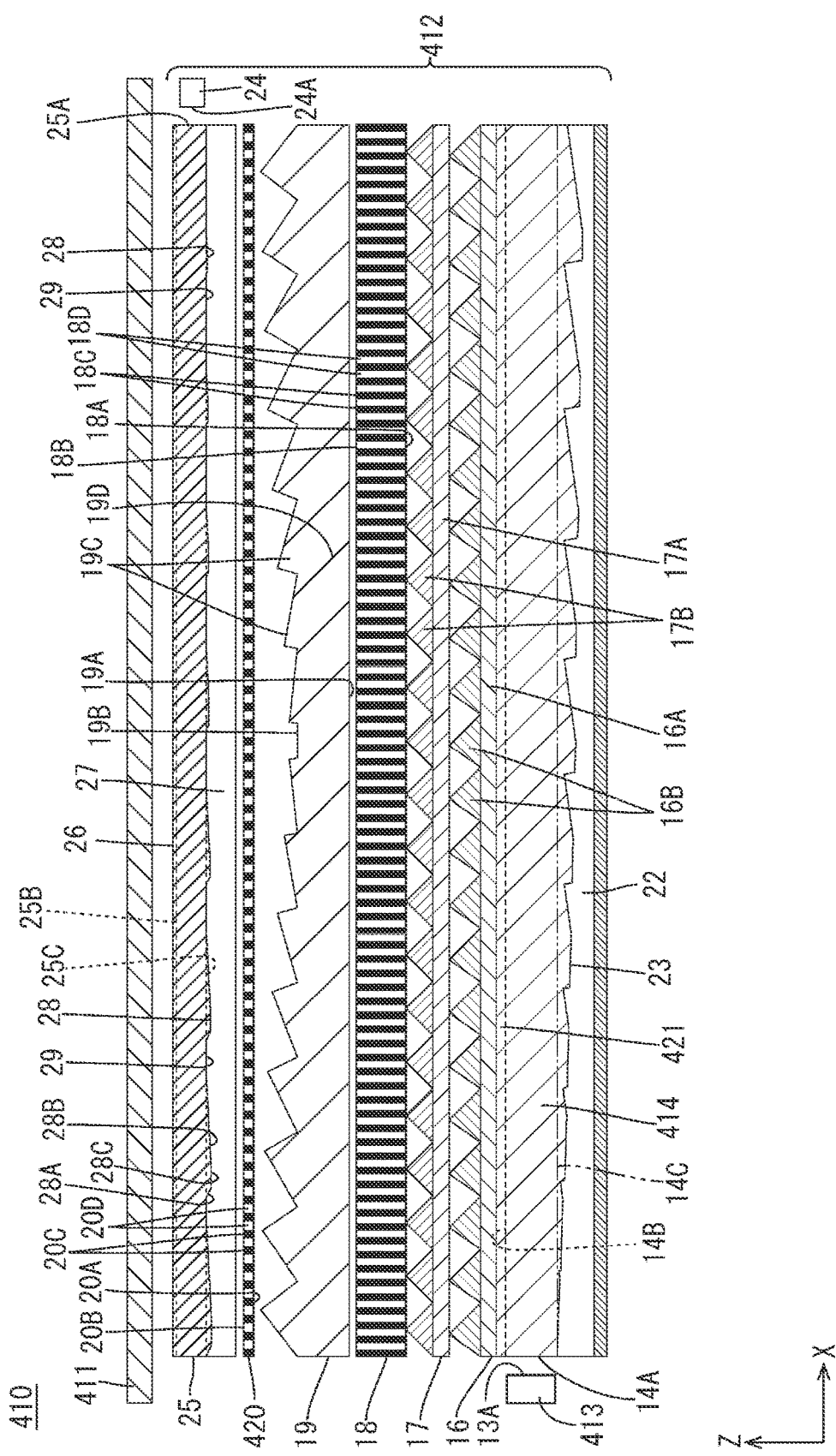
FIG. 16 is a side cross-sectional view of a liquid crystal display device according to a fifth embodiment.

As illustrated in FIG. 16, the backlight device 412 according to the present embodiment includes a second LED (second light source) 24, and a second light guide plate 25 aligned along the X-axis direction (first direction) with respect to the second LED 24. The second LED 24 has a substantially block shape, and one face of a pair of faces along the Y-axis direction and the Z-axis direction is a second light-emitting face 24A that emits light. A plurality of the second LEDs 24 are disposed side by side at an interval along the Y-axis direction. The second LED 24 is mounted on an LED substrate. The second LED 24 has a configuration in which an LED chip is sealed with a sealing material on a substrate portion mounted on the LED substrate. The LED chip provided in the second LED 24 emits light of a single color, for example, blue light. A phosphor is dispersed and mixed in the sealing material provided in the second LED 24. The phosphor contained in the sealing material includes a yellow phosphor, a green phosphor, a red phosphor, and the like. The second LED 24 including such an LED chip and such a sealing material emits white light as a whole.

The second light guide plate 25 is formed of a synthetic resin material (for example, acrylic resin such as PMMA or the like) that has a sufficiently higher refractive index than that of the air and that is substantially transparent. As illustrated in FIG. 16, the second light guide plate 25 has a plate shape, and a main surface of the second light guide plate 25 is parallel to the main surface of a liquid crystal panel 411 and the like. Note that the main surface of the second light guide plate 25 is parallel to the X-axis direction and the Y-axis direction, and a normal direction (thickness direction) of the main surface coincides with the Z-axis direction. The second light guide plate 25 is disposed on the left side in FIG. 16 to the second LED 24. In other words, a positional relationship between the second light guide plate 25 and the second LED 24 in the X-axis direction is reverse to a positional relationship between a first light guide plate 414 and a first LED 413 in the X-axis direction. In this way, the first LED 413 and the second LED 24 are disposed in a non-overlapping manner with each other. The second light guide plate 25 is disposed in a position overlapping a back side in the Z-axis direction of the liquid crystal panel 411 and is disposed in a position overlapping a front side of a second louver 420. One end face of an outer circumferential end face of the second light guide plate 25 is a second light entering end face 25A facing the second light-emitting face 24A of the second LED 24. The second light entering end face 25A is a face parallel to the second light-emitting face 24A of the second LED 24, and light emitted from the second light-emitting face 24A is incident on the second light entering end face 25A. A main surface on a front side facing the liquid crystal panel 411 of a pair of the main surfaces in the second light guide plate 25 is a second light guide plate-light emission main surface 25B that emits light guided through the inside of the second light guide plate 25. A main surface on the back side facing the second louver 420 of the pair of the main surfaces in the second light guide plate 25 is a second opposite main surface 25C located on a side opposite to the second light guide plate-light emission main surface 25B. Then, the second light guide plate 25 can introduce, from the second light entering end face 25A, light emitted from the second LED 24 toward the second light guide plate 25, can propagate the light therein, then, can allow the light to rise along the Z-axis direction such that the light is directed toward the liquid crystal panel 411 on the front side (light emission side), and can emit the light from the second light guide plate-light emission main surface 25B. In addition, the second light guide plate 25 can introduce, from the second opposite main surface 25C, emission light from the second louver 420, and can also emit the light from the second light guide plate-light emission main surface 25B toward the liquid crystal panel 411 on the front side. Note that a normal direction of the second light entering end face 25A coincides with the X-axis direction (an alignment direction of the second LED 24 and the second light guide plate 25).

As illustrated in FIG. 16, a fourth light guide plate lens 26, a fifth light guide plate lens 27, and a sixth light guide plate lens 28 are provided on the second light guide plate 25. The fourth light guide plate lens 26 is provided on the second light guide plate-light emission main surface 25B of the second light guide plate 25. The fourth light guide plate lens 26 extends along the X-axis direction, and a plurality of the fourth light guide plate lenses 26 are disposed side by side along the Y-axis direction. The fourth light guide plate lens 26 is a so-called a lenticular lens. A specific configuration of the fourth light guide plate lens 26 is substantially the same as that of the first light guide plate lens 421, and a detailed description is as described in the first embodiment described above (see FIG. 3). Note that a contact angle of the fourth light guide plate lens 26 may be smaller than a contact angle of the first light guide plate lens 421, and may be approximately 30°, for example. The fifth light guide plate lens 27 is provided on the second opposite main surface 25C of the second light guide plate 25. The fifth light guide plate lens 27 extends along the X-axis direction, and a plurality of the fifth light guide plate lenses 27 are disposed side by side along the Y-axis direction. The fifth light guide plate lens 27 is a convex-shaped prism that protrudes from the second opposite main surface 25C to the back side. A specific configuration of the fifth light guide plate lens 27 is substantially the same as that of the second light guide plate lens 22 described in the first embodiment (see FIG. 2), and a detailed description will be omitted.

As illustrated in FIG. 16, the sixth light guide plate lens 28 is provided on the second opposite main surface 25C of the second light guide plate 25. A plurality of the sixth light guide plate lenses 28 are disposed side by side at an interval along the X-axis direction. The sixth light guide plate lens 28 protrudes from the second opposite main surface 25C toward the back side along the Z-axis direction. The sixth light guide plate lens 28 includes a sixth light guide plate inclined surface (seventh inclined surface) 28A disposed on a side opposite (left side in FIG. 16) to the second LED 24 side in the X-axis direction, a seventh light guide plate inclined surface 28B disposed on the second LED 24 side (right side in FIG. 16) in the X-axis direction, and a first plane 28C located between the sixth light guide plate inclined surface 28A and the seventh light guide plate inclined surface 28B. The sixth light guide plate inclined surface 28A has an inclination rising from the second LED 24 side (right side in FIG. 16) of the second light guide plate 25 in the X-axis direction toward a side opposite (left side in FIG. 16) to the second LED 24 side. The seventh light guide plate inclined surface 28B has an inclination rising from the side opposite (left side in FIG. 16) to the second LED 24 side of the second light guide plate 25 in the X-axis direction toward the second LED 24 side (right side in FIG. 16). The first plane 28C is a face parallel to the X-axis direction and the Y-axis direction. Further, a second plane 29 is provided between two sixth light guide plate lenses 28 that are adjacent to each other in the X-axis direction. Therefore, the sixth light guide plate lens 28 and the second plane 29 are repeatedly and alternately arranged side by side along the X-axis direction.

As illustrated in FIG. 16, the sixth light guide plate inclined surface 28A reflects light propagating inside the second light guide plate 25, raises the light toward the front side, and can thus promote emission from the second light guide plate-light emission main surface 25B. Specifically, the sixth light guide plate inclined surface 28A mainly functions to reflect and raise light traveling away from the second LED 24 in the X-axis direction inside the second light guide plate 25. The sixth light guide plate inclined surface 28A has an inclination angle with respect to the X-axis direction set to be, for example, equal to or less than 40°, and preferably set to approximately 27°. When the inclination angle of the sixth light guide plate inclined surface 28A with respect to the X-axis direction is set to be equal to or less than 40°, light can be raised in a direction inclined to the side opposite to the second LED 24 side in the X-axis direction with respect to a front direction. Therefore, emission light from the second light guide plate-light emission main surface 25B includes light toward the side opposite to the second LED 24 side in the X-axis direction with respect to the Z-axis direction (normal direction of the second light guide plate-light emission main surface 25B) more than light toward the second LED 24 side in the X-axis direction. Therefore, when the second LED 24 is turned on, emission light having a brightness angle distribution in which peak brightness according to the emission light is biased toward the side opposite to the second LED 24 side in the X-axis direction can be supplied. In a liquid crystal display device 410 for vehicle application installed in front of a passenger seat of a passenger vehicle, the second LED 24 is preferably disposed on a side opposite to a driver seat side in the X-axis direction. In this way, for example, while a passenger vehicle is traveling, by the first LED 413 being turned on and the second LED 24 being turned off, although a display image of the liquid crystal display device 410 can be visually recognized from a passenger seat, the display image of the liquid crystal display device 410 cannot be visually recognized from a driver seat. In contrast, while a passenger vehicle is stopped, by both of the first LED 413 and the second LED 24 being turned on, a display image of the liquid crystal display device 410 can be visually recognized from both of a driver seat and a passenger seat. In this way, whether a display image can be visually recognized from a driver seat can be adjusted by controlling driving of the second LED 24 according to a traveling situation of a passenger vehicle.

On the other hand, the seventh light guide plate inclined surface 28B can reflect and raise light traveling toward the second LED 24 in the X-axis direction, and can reflect light traveling away from the second LED 24 in the X-axis direction inside the second light guide plate 25 and guide the light so as to go farther away from the second LED 24. The seventh light guide plate inclined surface 28B has an inclination angle of, for example, approximately 3° with respect to the X-axis direction, and the inclination angle is smaller than the inclination angle of the sixth light guide plate inclined surface 28A. Further, the plurality of sixth light guide plate lenses 28 aligned along the X-axis direction are designed such that a height dimension (dimension in the Z-axis direction) increases while going away from the second LED 24 in the X-axis direction, but an arrangement pitch in the X-axis direction is constant. A length of the sixth light guide plate inclined surface 28A slightly increases while going away from the second LED 24 in the X-axis direction. A length of the seventh light guide plate inclined surface 28B increases while going away from the second LED 24 in the X-axis direction, and an increasing rate of this length is higher than an increasing rate of the length of the sixth light guide plate inclined surface 28A. A length of the first plane 28C is set constant regardless of a position in the X-axis direction. A length of the second plane 29 decreases while going away from the second LED 24 in the X-axis direction. Note that each of the inclination angle of the sixth light guide plate inclined surface 28A with respect to the X-axis direction and the inclination angle of the seventh light guide plate inclined surface 28B with respect to the X-axis direction is set constant regardless of a position in the X-axis direction.

As described above, the present embodiment includes: the second LED (second light source) 24; and the second light guide plate 25 aligned along the first direction with respect to the second LED 24, wherein the second light guide plate 25 includes at least a part of an outer circumferential end face as the second light entering end face 25A facing the second LED 24, includes one main surface as the second light guide plate-light emission main surface (fifth light emission main surface) 25B configured to emit light, and includes an other main surface as the second opposite main surface (opposite main surface) 25C facing the third light emission main surface 420B and being provided with the sixth light guide plate lens (second lens) 28, and the sixth light guide plate lens 28 includes the sixth light guide plate inclined surface (seventh inclined surface) 28A having an inclination rising from a side opposite to the second LED 24 in the first direction in the second light guide plate 25 toward the second LED 24 side.

Light emitted from the second LED 24 and incident on the second light entering end face 25A of the second light guide plate 25 is incident on the sixth light guide plate inclined surface 28A of the sixth light guide plate lens 28 provided on the second opposite main surface 25C in a process of propagating inside the second light guide plate 25. The light incident on the sixth light guide plate inclined surface 28A having an inclination rising from the side opposite to the second LED 24 in the first direction in the second light guide plate 25 toward the second LED 24 side is reflected and emitted from the second light guide plate-light emission main surface 25B. The emission light from the second light guide plate-light emission main surface 25B includes light toward the side opposite to the second LED 24 side in the first direction with respect to a normal direction of the second light guide plate-light emission main surface 25B more than light toward the second LED 24 side in the first direction. Therefore, when the second LED 24 is turned on, emission light having a brightness angle distribution in which peak brightness according to the emission light is biased toward the side opposite to the second LED 24 side in the first direction can be supplied.

OTHER EMBODIMENTS

The techniques disclosed in the present specification are not limited to the embodiments described above and illustrated in the drawings, and the following embodiments, for example, are also included within the technical scope.

(1) In the configuration described in the first to fourth embodiments, a third louver can also be installed in a position on the front side of the second louvers 20, 120, and 220 and the back side of the liquid crystal panel 11. The third louver includes at least two third light blocking portions disposed at an interval in the Y-axis direction orthogonal to the X-axis direction, and a third light-transmitting portion disposed between the two third light blocking portions. An emission angle in the Y-axis direction of emission light can be restricted by the third louver. In this way, reflection of a display image on a windshield of a passenger vehicle can be avoided.

(2) In the configuration described in the fifth embodiment, the third louver described in (1) described above can also be installed in a position on the front side of the second light guide plate 25 and the back side of the liquid crystal panel 411.

(3) In the configuration described in the third embodiment, the linear Fresnel lens sheet 219 can also be molded integrally with the second louver 220. In that case, an uncured ultraviolet-curing resin material is filled into a mold for molding, and the second louver 220 is also applied to an opening end of the mold to dispose the uncured ultraviolet-curing resin material so as to contact the main surface on the front side, and in this state, the ultraviolet-curing resin material is irradiated with ultraviolet rays through the second louver 220, and the linear Fresnel lens sheet 219 can be integrally provided with the second louver 220.

(4) In the configuration described in the fourth embodiment, the linear Fresnel lens sheet 319 can also be molded integrally with the first louver 318. In that case, an uncured ultraviolet-curing resin material is filled into a mold for molding, and the first louver 318 is also applied to an opening end of the mold to dispose the uncured ultraviolet-curing resin material so as to contact the main surface on the front side, and in this state, the ultraviolet-curing resin material is irradiated with ultraviolet rays through the first louver 318, and the linear Fresnel lens sheet 319 can be integrally provided with the first louver 318.

(5) In the configuration described in the fifth embodiment, a positional relationship between the second light guide plate 25 and the second LED 24 in the X-axis direction may be the same as a positional relationship between the first light guide plates 14 and 414 and the first LEDs 13 and 413 in the X-axis direction.

(6) The plurality of first lenses 19C, 119C, 219C, and 319C provided in the linear Fresnel lens sheets 19, 119, 219, and 319 may include the plurality of first lenses 19C, 119C, 219C, and 319C in which the angle θ1 of the first inclined surface 19C1 with respect to the X-axis direction (angle θ2 of the second inclined surface 19C2 with respect to the X-axis direction) is the same. In other words, the angle θ1 of the first inclined surface 19C1 with respect to the X-axis direction (angle θ2 of the second inclined surface 19C2 with respect to the X-axis direction) may not be different in all the first lenses 19C, 119C, 219C, and 319C.

(7) A specific numerical value of each angle (the angle θ1 of the first inclined surface 19C1 with respect to the X-axis direction, the angle θ2 of the second inclined surface 19C2 with respect to the X-axis direction, and the apex angle θ3 formed between the first inclined surface 19C1 and the second inclined surface 19C2) in the first lenses 19C, 119C, 219C, and 319C provided in the linear Fresnel lens sheets 19, 119, 219, and 319 can be changed as appropriate. In that case, the angle θ1 of the first inclined surface 19C1 with respect to the X-axis direction is preferably in a range from 0° to 24°, and the angle θ2 of the second inclined surface 19C2 with respect to the X-axis direction is preferably in a range from 46° to 70°, but may fall outside the ranges. Further, when the angle θ1 of the first inclined surface 19C1 with respect to the X-axis direction is in the range from 0° to 24° and the angle θ2 of the second inclined surface 19C2 with respect to the X-axis direction is in the range from 46° to 70°, a numerical value of the apex angle θ3 formed between the first inclined surface 19C1 and the second inclined surface 19C2 can be set to be a numerical value (for example, 80°, 90°, 100°, 120°, and the like) other than 110°. Further, when the angle θ1 of the first inclined surface 19C1 with respect to the X-axis direction is outside the range from 0° to 24° and the angle θ2 of the second inclined surface 19C2 with respect to the X-axis direction is outside the range from 46° to 70°, a numerical value of the apex angle θ3 formed between the first inclined surface 19C1 and the second inclined surface 19C2 can be set to be a numerical value (for example, 80°, 90°, 100°, 120°, and the like) other than 110°. Further, a specific material used in the linear Fresnel lens sheets 19, 119, 219, and 319 can be changed as appropriate.

(8) A specific numerical value such as the contact angle and the inclination angle of each of the light guide plate lenses 21 to 23 and 421 provided in the first light guide plates 14 and 414 can be changed as appropriate. A specific material used in the first light guide plates 14 and 414 can be changed as appropriate.

(9) A specific numerical value such as the contact angle and the inclination angle of each of the light guide plate lenses 26 to 28 provided in the second light guide plate 25 described in the fifth embodiment can be changed as appropriate. A specific material used in the second light guide plate 25 can be changed as appropriate.

(10) Any one or both of the first light guide plate lenses 21 and 421 and the second light guide plate lens 22 provided in the first light guide plates 14 and 414 can also be omitted.

(11) Any one or both of the fourth light guide plate lens 26 and the fifth light guide plate lens 27 provided in the second light guide plate 25 can also be omitted.

(12) A thickness of the first light guide plates 14 and 414 may be configured to decrease while going away from the first LEDs 13 and 413, and the first opposite main surface 14C may be configured to be inclined.

(13) A thickness of the second light guide plate 25 described in the fifth embodiment may be configured to decrease while going away from the second LED 24, and the second opposite main surface 25C may be configured to be inclined.

(14) A specific numerical value such as the inclination angle and the apex angle of each of the prism inclined surfaces 16B1, 16B2, 17B1, and 17B2 of each of the prisms 16B and 17B provided in each of the prism sheets 16 and 17 can be changed as appropriate. A specific material used in each of the base materials 16A and 17A of each of the prism sheets 16 and 17 can be changed as appropriate. Similarly, a specific material used in each of the prisms 16B and 17B can also be changed as appropriate.

(15) A specific cross-sectional shape of each of the prisms 16B and 17B provided in each of the prism sheets 16 and 17 can be changed as appropriate. In that case, for example, any of the prism inclined surfaces 16B1, 16B2, 17B1, and 17B2 in each of the prisms 16B and 17B may have a bent shape so as to have a plurality of inclination angles.

(16) In the first louvers 18, 118 and 318, a specific numerical value of a ratio (tan θ) acquired by dividing a width of the first light-transmitting portion 18D by a height can be changed as appropriate in addition to tan 10°, and can be, for example, tan 12.5°, tan 15°, tan 17.5°, and the like.

(17) In the second louvers 20, 120, 220, and 420, a specific numerical value of a ratio (tan θ) acquired by dividing a width of the second light-transmitting portion 20D by a height can be changed as appropriate in addition to tan 45°, and can be, for example, tan 50°, and the like.

(18) A light source such as an organic electro luminescence (EL) may be used instead of the first LEDs 13 and 413 and the second LED 24.

(19) The configuration described in the fifth embodiment can also be combined with the configurations described in the second embodiment to the fourth embodiment.

(20) A reflective polarizing sheet instead of a polarizer may be attached to the main surface on the back side (outer side) of the array substrate constituting the liquid crystal panels 11 and 411. The reflective polarizing sheet includes a polarization layer having a specific polarization axis (transmission axis), a multilayer film in which layers having mutually different refractive indices are alternately layered, a protection layer, and the like. The polarization layer has a polarization axis and an absorption axis orthogonal to the polarization axis, so that linearly polarized light parallel to the polarization axis can be selectively transmitted and circularly polarized light can be converted to linearly polarized light along the polarization axis. The polarization axis of the polarization layer has an orthogonal relationship to the polarization axis of the polarizer attached to the main surface at the outer side of the CF substrate. The multilayer film has a multilayer structure, and has a reflection characteristic that the reflectivity for the s-waves included in light is generally higher than the reflectivity for the p-waves. The reflective polarizing sheet being provided with the multilayer film can reflect s-waves that are originally to be absorbed by the polarization layer toward the back side to allow the s-waves to be reused, thereby enhancing the usage efficiency (and then, brightness) of light.

(21) Instead of the first prism sheet 16 and the second prism sheet 17, a prism sheet with a prism provided on the light entering main surface side can also be used. The prism sheet has a configuration in which the light entering main surface faces the first light guide plate-light emission main surface 14B of the first light guide plates 14 and 414, the light emission main surface is disposed so as to face the first light entering main surface 18A of the first louvers 18, 118, and 318, and a plurality of prisms are provided side by side along the X-axis direction on the light entering main surface. Even when such a prism sheet is used, light having less side lobe light can be supplied to the first louvers 18, 118, and 318, and the amount of transmitted light of the first light-transmitting portion 18D can be sufficiently ensured.

(22) The liquid crystal display devices 10 and 410 for vehicle application may be installed in a position other than the front of a passenger seat of a passenger vehicle. For example, the liquid crystal display devices 10 and 410 may be installed in a position between a passenger seat and a driver seat, and the like. An angle range of a required viewing angle is also changed due to a change in an arrangement of the liquid crystal display devices 10 and 410. Accordingly, each configuration (such as a ratio between a width and a height of each of the light-transmitting portions 18D and 20D, and an inclination angle of each of the inclined surfaces 19C1 and 19C2 of the first lenses 19C, 119C, 219C, and 319C) of the first louvers 18, 118, and 318, the linear Fresnel lens sheets 19, 119, 219, and 319, and the second louvers 20, 120, 220, and 420 may be changed.

(23) The liquid crystal display devices 10 and 410 can, in addition to vehicle application, also be used in devices that require restricting a viewing angle, such as automatic teller machines (ATMs), notebook computers, and tablet computers, for example. When an application of the liquid crystal display devices 10 and 410 is changed, an angle range of a required viewing angle is also changed. Accordingly, each configuration (such as a ratio between a width and a height of each of the light-transmitting portions 18D and 20D, and an inclination angle of each of the inclined surfaces 19C1 and 19C2 of the first lenses 19C, 119C, 219C, and 319C) of the first louvers 18, 118, and 318, the linear Fresnel lens sheets 19, 119, 219, and 319, and the second louvers 20, 120, 220, and 420 may be changed.

While preferred embodiments of the present disclosure have been described above, it is to be understood that variations and modifications will be apparent to those skilled in the art without departing from the scope and spirit of the present invention. The scope of the present invention, therefore, is to be determined solely by the following claims.

What is claimed is:

1. An illumination device comprising:
a first sheet including a first light entering main surface being one main surface disposed along a first direction, a first light emission main surface being another main surface along the first direction, a plurality of first light blocking portions being disposed side by side at an interval in the first direction, and a plurality of first light-transmitting portions being disposed side by side at an interval in the first direction, the plurality of first light blocking portions and the plurality of first light-transmitting portions being repeatedly and alternately disposed side by side in the first direction;
a second sheet including a second light entering main surface being one main surface disposed along the first direction and configured to face the first light emission main surface, a second light emission main surface being another main surface along the first direction, and a first lens disposed on the second light entering main surface or the second light emission main surface; and
a third sheet including a third light entering main surface being one main surface disposed along the first direction and configured to face the second light emission main surface, a third light emission main surface being another main surface along the first direction, a plurality of second light blocking portions being disposed side by side at an interval in the first direction, and a plurality of second light-transmitting portions being disposed side by side at an interval in the first direction, the plurality of second light blocking portions and the plurality of second light-transmitting portions being repeatedly and alternately disposed side by side in the first direction,
wherein the first lens includes a first inclined surface having an inclination rising from an end side in the first direction in the second sheet toward a central side, and
the third sheet has a ratio acquired by dividing a width of the plurality of second light-transmitting portions by a height of the plurality of second light-transmitting portions greater than a ratio acquired by dividing a width of the plurality of first light-transmitting portions by a height of the plurality of first light-transmitting portions.

2. The illumination device according to claim 1,
wherein the first lens is disposed on the second light entering main surface, and
the second light emission main surface of the second sheet is attached to the third light entering main surface of the third sheet.

3. The illumination device according to claim 1,
wherein the first lens is disposed on the second light emission main surface, and
the second light entering main surface of the second sheet is attached to the first light emission main surface of the first sheet.

4. A display device, comprising:
the illumination device according to claim 1; and
a display panel configured to perform displaying by using light from the illumination device.

5. An illumination device comprising:
a first sheet including a first light entering main surface being one main surface disposed along a first direction, a first light emission main surface being another main surface along the first direction, two first light blocking portions disposed at an interval in the first direction, and a first light-transmitting portion disposed between the two first light blocking portions;
a second sheet including a second light entering main surface being one main surface disposed along the first direction and configured to face the first light emission main surface, a second light emission main surface being another main surface along the first direction, and a first lens disposed on the second light entering main surface or the second light emission main surface; and
a third sheet including a third light entering main surface being one main surface disposed along the first direction and configured to face the second light emission main surface, a third light emission main surface being another main surface along the first direction, two second light blocking portions disposed at an interval in the first direction, and a second light-transmitting portion disposed between the two second light blocking portions,
wherein the first lens includes a first inclined surface having an inclination rising from an end side in the first direction in the second sheet toward a central side,
the third sheet has a ratio acquired by dividing a width of the second light-transmitting portion by a height of the second light-transmitting portion greater than a ratio acquired by dividing a width of the first light-transmitting portion by a height of the first light-transmitting portion,
a plurality of first lenses, including the first lens, is disposed side by side in the first direction,
the plurality of first lenses includes a central side lens and an end side lens located closer to the end side in the first direction in the second sheet than the central side lens, and
an angle formed by the first inclined surface of the end side lens with respect to the first direction is greater than an angle formed by the first inclined surface of the central side lens with respect to the first direction.

6. The illumination device according to claim 5,
Wherein each of the plurality of first lenses includes a second inclined surface having an inclination rising from the central side in the first direction in the second sheet toward the end side.

7. The illumination device according to claim 6,
wherein an apex angle being an angle formed between the first inclined surface and the second inclined surface of the central side lens is equal to an apex angle of the end side lens, and
an angle formed by the second inclined surface of the end side lens with respect to the first direction is smaller than an angle formed by the second inclined surface of the central side lens with respect to the first direction.

8. The illumination device according to claim 7,
wherein the plurality of first lenses has an angle formed by the first inclined surface with respect to the first direction in a range from 0° to 24°, and has an angle formed by the second inclined surface with respect to the first direction in a range from 46° to 70°.

9. An illumination device comprising:
a first sheet including a first light entering main surface being one main surface disposed along a first direction, a first light emission main surface being another main surface along the first direction, two first light blocking portions disposed at an interval in the first direction, and a first light-transmitting portion disposed between the two first light blocking portions;
a second sheet including a second light entering main surface being one main surface disposed along the first direction and configured to face the first light emission main surface, a second light emission main surface being another main surface along the first direction, and a first lens disposed on the second light entering main surface or the second light emission main surface;
a third sheet including a third light entering main surface being one main surface disposed along the first direction and configured to face the second light emission main surface, a third light emission main surface being another main surface along the first direction, two second light blocking portions disposed at an interval in the first direction, and a second light-transmitting portion disposed between the two second light blocking portions;
a first light source;
a first light guide plate aligned along the first direction with respect to the first light source;
a first prism sheet disposed on a light emission side with respect to the first light guide plate, the first prism sheet including a plurality of first prisms disposed side by side along the first direction and configured to extend along a second direction orthogonal to both of the first direction and a normal direction of a main surface of the first light guide plate; and
a second prism sheet disposed on a light emission side with respect to the first prism sheet, the second prism sheet including a plurality of second prisms disposed side by side along the first direction and configured to extend along the second direction,
wherein the first lens includes a first inclined surface having an inclination rising from an end side in the first direction in the second sheet toward a central side,
the third sheet has a ratio acquired by dividing a width of the second light-transmitting portion by a height of the second light-transmitting portion greater than a ratio acquired by dividing a width of the first light-transmitting portion by a height of the first light-transmitting portion,
the first light guide plate includes at least a part of an outer circumferential end face as a first light entering end face facing the first light source, and further includes one main surface as a fourth light emission main surface configured to emit light,
the second prism sheet includes a main surface on the light emission side facing the first light entering main surface of the first sheet,
each of the plurality of first prisms includes a third inclined surface having an inclination rising from a first light source side in the first direction in the first prism sheet toward a side opposite the first light source, and includes a fourth inclined surface having an inclination rising from the side opposite the first light source in the first direction in the first prism sheet toward the first light source side,
each of the plurality of second prisms includes a fifth inclined surface having an inclination rising from a first light source side in the first direction in the second prism sheet toward a side opposite the first light source, and includes a sixth inclined surface having an inclination rising from the side opposite the first light source in the first direction in the second prism sheet toward the first light source side, and
an angle formed by the fifth inclined surface in the second prism with respect to the first direction is smaller than an angle formed by the third inclined surface in the first prism with respect to the first direction.

10. The illumination device according to claim 9, further comprising:
a second light source; and
a second light guide plate aligned along the first direction with respect to the second light source,
wherein the second light guide plate includes:
at least a part of an outer circumferential end face as a second light entering end face facing the second light source,
one main surface as a fifth light emission main surface configured to emit light, and
another main surface as an opposite main surface facing the third light emission main surface and being provided with a second lens, and
the second lens includes a seventh inclined surface having an inclination rising from a side opposite the second light source in the first direction in the second light guide plate toward a second light source side.

11. An illumination device comprising:
a first sheet including a first light entering main surface being one main surface disposed along a first direction, a first light emission main surface being another main surface along the first direction, two first light blocking portions disposed at an interval in the first direction, and a first light-transmitting portion disposed between the two first light blocking portions;
a second sheet including a second light entering main surface being one main surface disposed along the first direction and configured to face the first light emission main surface, a second light emission main surface being another main surface along the first direction, and a first lens disposed on the second light entering main surface or the second light emission main surface;
a third sheet including a third light entering main surface being one main surface disposed along the first direction and configured to face the second light emission main surface, a third light emission main surface being another main surface along the first direction, two second light blocking portions disposed at an interval in the first direction, and a second light-transmitting portion disposed between the two second light blocking portions;

a first light source;

a first light guide plate aligned along the first direction with respect to the first light source;

a first prism sheet disposed on a light emission side with respect to the first light guide plate, the first prism sheet including a plurality of first prisms disposed side by side along the first direction and configured to extend along a second direction orthogonal to both of the first direction and a normal direction of a main surface of the first light guide plate;

a second prism sheet disposed on a light emission side with respect to the first prism sheet, the second prism sheet including a plurality of second prisms disposed side by side along the first direction and configured to extend along the second direction;

a second light source; and a second light guide plate aligned along the first direction with respect to the second light source, wherein the first lens includes a first inclined surface having an inclination rising from an end side in the first direction in the second sheet toward a central side, the third sheet has a ratio acquired by dividing a width of the second light-transmitting portion by a height of the second light-transmitting portion greater than a ratio acquired by dividing a width of the first light-transmitting portion by a height of the first light-transmitting portion, the first light guide plate includes at least a part of an outer circumferential end face as a first light entering end face facing the first light source, and further includes one main surface as a fourth light emission main surface configured to emit light, the second prism sheet includes a main surface on the light emission side facing the first light entering main surface of the first sheet, the second light guide plate includes:
at least a part of an outer circumferential end face as a second light entering end face facing the second light source, one main surface as a fifth light emission main surface configured to emit light, and another main surface as an opposite main surface facing the third light emission main surface and being provided with a second lens, and the second lens includes a seventh inclined surface having an inclination rising from a side opposite the second light source in the first direction in the second light guide plate toward a second light source side.

* * * * *